(12) United States Patent
McCoy

(10) Patent No.: US 12,070,975 B2
(45) Date of Patent: Aug. 27, 2024

(54) UNDER BED HITCH MOUNTING SYSTEM

(71) Applicant: HORIZON GLOBAL AMERICAS INC., Plymouth, MI (US)

(72) Inventor: Richard W. McCoy, Granger, IN (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 17/384,918

(22) Filed: Jul. 26, 2021

(65) Prior Publication Data

US 2021/0347217 A1    Nov. 11, 2021

Related U.S. Application Data

(63) Continuation of application No. 16/685,080, filed on Nov. 15, 2019, now Pat. No. 11,072,214, which is a continuation of application No. 15/459,034, filed on Mar. 15, 2017, now Pat. No. 10,479,153, which is a continuation of application No. 13/992,331, filed as application No. PCT/US2011/063922 on Nov. 8, 2011, now abandoned.

(60) Provisional application No. 61/421,156, filed on Dec. 8, 2010.

(51) Int. Cl.
| | |
|---|---|
| B60D 1/48 | (2006.01) |
| B60D 1/01 | (2006.01) |
| B60D 1/06 | (2006.01) |
| B60D 1/07 | (2006.01) |
| B60D 1/52 | (2006.01) |

(52) U.S. Cl.
CPC ............. *B60D 1/488* (2013.01); *B60D 1/015* (2013.01); *B60D 1/06* (2013.01); *B60D 1/075* (2013.01); *B60D 1/52* (2013.01)

(58) Field of Classification Search
CPC ........... B60D 1/488; B60D 1/015; B60D 1/06
See application file for complete search history.

(56) References Cited

U.S. PATENT DOCUMENTS

| | | |
|---|---|---|
| 1,958,723 A | 5/1934 | Spencer |
| 1,996,162 A | 4/1935 | Lubbers |
| 2,027,990 A | 1/1936 | Lubbers |
| 2,041,124 A | 5/1936 | Francis |
| 2,289,079 A | 7/1942 | Seyferth |

(Continued)

FOREIGN PATENT DOCUMENTS

| | | |
|---|---|---|
| DE | 2121876 | 4/1971 |
| EP | 0038928 B1 | 4/1981 |

(Continued)

OTHER PUBLICATIONS

International Search Report for International App. No. PCT/US2011/063922 mailed May 8, 2012.

(Continued)

*Primary Examiner* — Kevin Hurley
*Assistant Examiner* — Michael R Stabley

(57) ABSTRACT

A hitch mounting system capable of attaching to a vehicle, where, the vehicle includes a frame and a load bed is disclosed. The hitch mounting system may include at least one rail, the rail being a generally continuous member, where the rail includes at least one end portion, and where the end portion is deformed in a shape capable of attaching to the frame of the vehicle. The hitch mounting system may also include at least one mounting aperture located in the rail, the mounting aperture capable of having secured thereto an accessory.

16 Claims, 15 Drawing Sheets

(56) References Cited

U.S. PATENT DOCUMENTS

| | | | |
|---|---|---|---|
| 2,507,616 A | 5/1950 | Stephen | |
| 2,513,117 A | 6/1950 | Stephen | |
| 2,543,749 A | 3/1951 | Walther | |
| 2,610,069 A | 9/1952 | Ketel | |
| 2,621,056 A | 12/1952 | Kayler | |
| 2,680,627 A | 6/1954 | Johnson et al. | |
| 2,749,144 A | 6/1956 | Kayler | |
| 2,778,657 A | 1/1957 | Chaplin | |
| 2,779,605 A | 1/1957 | Braunberger | |
| 2,799,516 A | 7/1957 | Greenway | |
| 2,809,851 A | 10/1957 | Beck | |
| 2,819,096 A | 1/1958 | Sencenich | |
| 2,856,203 A | 10/1958 | Kayler | |
| 2,860,891 A | 11/1958 | Ramun | |
| 2,900,194 A | 8/1959 | De Lay | |
| 2,925,286 A | 2/1960 | Hodges, Jr. et al. | |
| 2,977,137 A | 3/1961 | Durham | |
| 2,985,463 A | 5/1961 | Geerds | |
| 3,073,624 A | 1/1963 | Thomas | |
| 3,112,936 A | 12/1963 | Cole et al. | |
| 3,170,716 A | 2/1965 | Walther et al. | |
| 3,171,672 A | 3/1965 | Dalton | |
| 3,198,549 A | 8/1965 | Martin | |
| 3,220,750 A | 11/1965 | Mead | |
| 3,318,616 A | 5/1967 | Fontaine et al. | |
| 3,402,944 A | 9/1968 | Day | |
| 3,584,899 A | 6/1971 | Gottler et al. | |
| 3,595,125 A | 7/1971 | Jacobs | |
| 3,606,384 A | 9/1971 | Fontaine et al. | |
| 3,630,545 A | 12/1971 | Fontaine et al. | |
| 3,640,549 A | 2/1972 | Neff et al. | |
| 3,746,369 A | 7/1973 | Neff et al. | |
| 3,844,584 A | 10/1974 | Fontaine | |
| 3,847,414 A | 11/1974 | Madura | |
| 3,861,709 A | 1/1975 | Mulcahy et al. | |
| 3,888,514 A | 6/1975 | Klein | |
| 3,893,710 A | 7/1975 | Madura | |
| 3,941,407 A | 3/1976 | Breford | |
| 4,017,095 A | 4/1977 | Best | |
| 4,029,335 A | 6/1977 | Cady et al. | |
| 4,039,087 A | 8/1977 | Sandvick, Sr. | |
| 4,134,601 A | 1/1979 | Propst | |
| 4,429,892 A | 2/1984 | Frampton et al. | |
| 4,477,100 A | 10/1984 | Elyakim | |
| 4,505,344 A | 3/1985 | Hobbs et al. | |
| 4,531,774 A | 7/1985 | Whatley | |
| 4,614,355 A | 9/1986 | Koch | |
| 4,721,323 A | 1/1988 | Czuk et al. | |
| 4,856,804 A | 8/1989 | Nash | |
| 4,892,324 A | 1/1990 | Spencer et al. | |
| 4,921,266 A | 5/1990 | Beals | |
| 4,928,987 A | 5/1990 | Hunger | |
| 4,946,183 A | 8/1990 | Benson et al. | |
| 4,960,288 A | 10/1990 | Chambers | |
| 4,962,945 A | 10/1990 | Vannoy et al. | |
| 5,044,651 A | 9/1991 | Weikel | |
| 5,120,080 A | 6/1992 | Ritter | |
| 5,141,277 A | 8/1992 | Alexander | |
| 5,246,244 A | 9/1993 | Colibert | |
| 5,306,037 A | 4/1994 | Robertson | |
| D362,224 S | 9/1995 | McCoy et al. | |
| 5,449,191 A | 9/1995 | Cattau | |
| 5,509,682 A | 4/1996 | Lindenman et al. | |
| 5,516,137 A | 5/1996 | Kass et al. | |
| 5,529,329 A | 6/1996 | McCoy | |
| D376,751 S | 12/1996 | Hanson et al. | |
| 5,580,073 A | 12/1996 | Irwin et al. | |
| D378,077 S | 2/1997 | Lindenman et al. | |
| 5,707,070 A | 1/1998 | Lindenman et al. | |
| 5,738,471 A | 4/1998 | Zentner et al. | |
| 5,772,229 A | 6/1998 | Cattau | |
| 5,839,745 A | 11/1998 | Cattau et al. | |
| 5,971,418 A | 10/1999 | Lindenman et al. | |
| 6,065,766 A | 5/2000 | Pulliam | |
| 6,170,850 B1 | 1/2001 | Works | |
| 6,179,316 B1 | 1/2001 | Sibley, Jr. | |
| 6,199,889 B1 | 3/2001 | Golembiewski et al. | |
| 6,467,791 B1 | 10/2002 | Fandrich et al. | |
| 6,502,846 B2 | 1/2003 | Fandrich et al. | |
| 6,520,528 B2 | 2/2003 | Fandrich et al. | |
| 6,523,841 B2 | 2/2003 | Glaser | |
| 6,533,308 B1 | 3/2003 | Tambormino | |
| 6,758,921 B1 | 7/2004 | Struebel | |
| 6,824,157 B1 | 11/2004 | Putnam | |
| 6,851,695 B2 | 2/2005 | Lindenman et al. | |
| 7,121,573 B2 | 10/2006 | Lindenman et al. | |
| 7,264,259 B2 | 9/2007 | Lindenman et al. | |
| 7,413,390 B1 | 8/2008 | Allison et al. | |
| 7,775,541 B2 | 8/2010 | Linger et al. | |
| 7,793,968 B1 | 9/2010 | Withers | |
| 7,828,317 B2 | 11/2010 | Withers et al. | |
| 7,918,476 B1 | 4/2011 | Linger et al. | |
| 8,414,009 B2 | 4/2013 | Stanifer | |
| 2003/0015855 A1 | 1/2003 | McCoy et al. | |
| 2003/0038452 A1 | 2/2003 | Lindenman et al. | |
| 2003/0209878 A1 | 11/2003 | Lindenman et al. | |
| 2003/0209879 A1 | 11/2003 | Lindenman et al. | |
| 2010/0109285 A1 | 5/2010 | Stanifer et al. | |
| 2012/0126509 A1 | 5/2012 | Erickson | |

FOREIGN PATENT DOCUMENTS

| | | |
|---|---|---|
| EP | 1078785 A2 | 2/2001 |
| EP | 1036679 B1 | 8/2004 |
| WO | WO2009030026 A1 | 3/2009 |

OTHER PUBLICATIONS

Cequent Towing Products, Inc., Installation Instructions Mounting Kit Ford F250/F350/F450 LD/HH/SD 6' & 8' Beds, Dec. 13, 2006, pp. 1-11, Litho in USA.

Cequent Performance Products, Installation Instructions Gooseneck Mounting Kit Chevrolet/GMC 2500/3500 Heavy Duty Short & Long Bed, (Part No. 4456), Apr. 11, 2011, pp. 1-8.

Instruction Sheet No. 63102N, Make/Model(s) Hide-A-Goose, Mar. 26, 2007, 4 pages.

Instruction Sheet No. 50117N, Make/Model(s) Dodge Pick-Ups, 2003-UP 2500, 3500 All Models, Mar. 22, 2007, 3 pages.

Cequent Towing Products, Inc., Operating Instructions Signature Series 5th Wheel Slider Hitch, pp. 1-12, Jan. 23, 2004, Litho in USA.

Cequent Towing Products, Inc., Installation Instructions Mounting Kit GM '99-'07 "Classic" 1500 (LD/HD) and 2500 5'8" & 6'6" Beds Only, Aug. 29, 2008, 10 pages, Litho in USA.

Cequent Towing Products, Inc., Installation Instructions Mounting Kit Ford 2004-Current F150 5.5', 6' and 8' Beds, 11 pages, Aug. 21, 2008, Litho in USA.

Cequent Towing Products, Inc., Assembly Instructions Signature Series 24K 5th Wheel Hitch, pp. 1-11, Jan. 28, 2004, Litho in USA.

Draw-Tite Catalog 2004, 7 pages.
Draw-Tite Catalog 2005, 7 pages.
Draw-Tite Catalog 2006, 5 pages.
Draw-Tite Catalog, 2007, 6 pages.
Draw-Tite Catalog, 2008, 3 pages.
Reese Catalog, 2004, 8 pages.
Reese Catalog, 2005, 9 pages.
Reese Catalog, 2006, 6 pages.
Reese Catalog, 2007, 7 pages.
Reese Catalog, 2008, 5 pages.

Cequent Towing Products, Inc., Operating Instructions Signature Series 5th Wheel Slider Hitch, pp. 1-12, Dec. 13, 2004, Litho in USA.

Cequent Towing Products, Inc., Assembly Instructions Signature Series 5th Wheel Slider Hitch, pp. 1-16, Jan. 23, 2004, Litho in USA.

Cequent Towing Products, Inc., Assembly Instructions Signature Series 5th Wheel Slider Hitch, pp. 1-16, Jan. 5, 2004, Litho in USA.

Cequent Towing Products, Inc., Assembly Instructions Signature Series 16K 5th Wheel Hitch, pp. 1-11, Mar. 15, 2005, Litho in USA.

(56) References Cited

OTHER PUBLICATIONS

Cequent Towing Products, Inc., Assembly Instructions Signature Series 24K 5th Wheel Hitch, pp. 1-11, Dec. 13, 2004, Litho in USA.
Cequent Towing Products, Inc., Operating Instructions Signature Series 16K 5th Wheel Hitch, pp. 1-9, Dec. 14, 2004, Litho in USA.
Cequent Towing Products, Inc., Assembly Instructions Signature Series Gooseneck, pp. 1-14, Oct. 13, 2006, Litho in USA.
Cequent Towing Products, Inc., Assembly Instructions Signature Series 24K 5th Wheel Hitch, pp. 1-11, Jun. 15, 2006, Litho in USA.
Cequent Towing Products, Inc., Assembly Instructions Signature Series 24K 5th Wheel Hitch, pp. 1-11, May 21, 2008, Litho in USA.
Cequent Towing Products, Inc., Assembly Instructions Signature Series 5th Wheel Slider Hitch, pp. 1-17, Jun. 2, 2004, Litho in USA.
Cequent Towing Products, Inc., Operating Instructions Signature Series 24K 5th Wheel Hitch, pp. 1-9, Mar. 15, 2005, Litho in USA.
Cequent Towing Products, Inc., Operating Instructions Signature Series 24K 5th Wheel Hitch, pp. 1-9, May 21, 2008, Litho in USA.
Cequent Towing Products, Inc., Operating Instructions Signature Series 24K 5th Wheel Hitch, pp. 1-9, Dec. 14, 2004, Litho in USA.
Cequent Towing Products, Inc., Operating Instructions Signature Series 24K 5th Wheel Hitch, pp. 1-9, Aug. 20, 2007, Litho in USA.
Cequent Towing Products, Inc., Assembly Instructions Signature Series 24K 5th Wheel Hitch, pp. 1-11, Jan. 6, 2006, Litho in USA.
Cequent Towing Products, Inc., Operating Instructions Signature Series 24K 5th Wheel Hitch, pp. 1-9, Jan. 28, 2004, Litho in USA.
Cequent Towing Products, Inc., Assembly Instructions Signature Series 5th Wheel Slider Hitch, pp. 1-17, Jan. 24, 2007, Litho in USA.
Cequent Towing Products, Inc., Operating Instructions Signature Series 5th Wheel Slider Hitch, pp. 1-12, Aug. 20, 2007, Litho in USA.
Cequent Towing Products, Inc., Operating Instructions Signature Series 5th Wheel Slider Hitch, pp. 1-12, Jan. 25, 2007, Litho in USA.

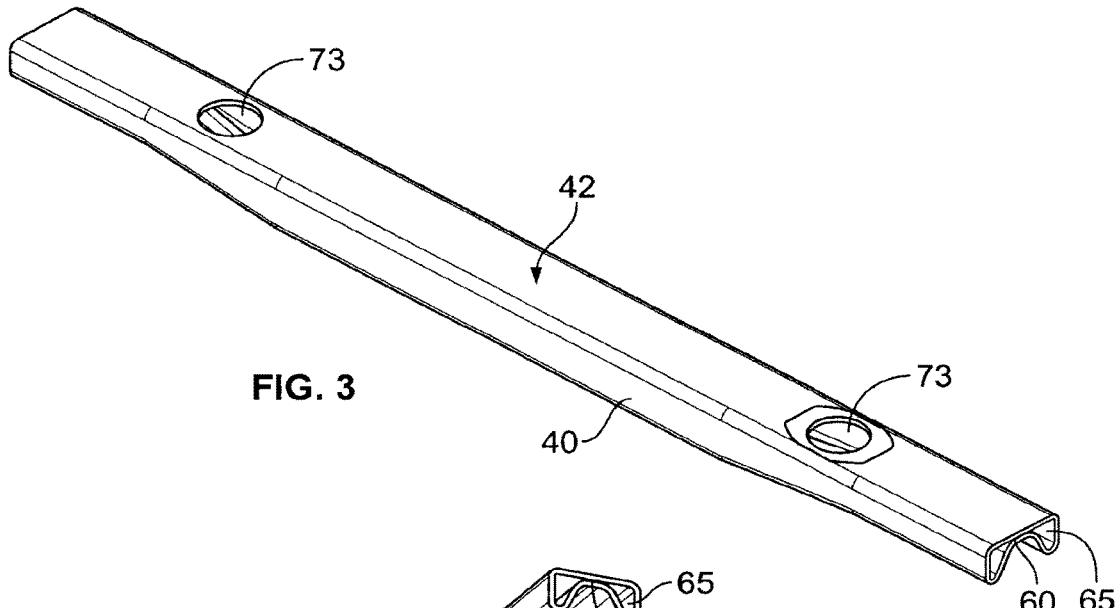
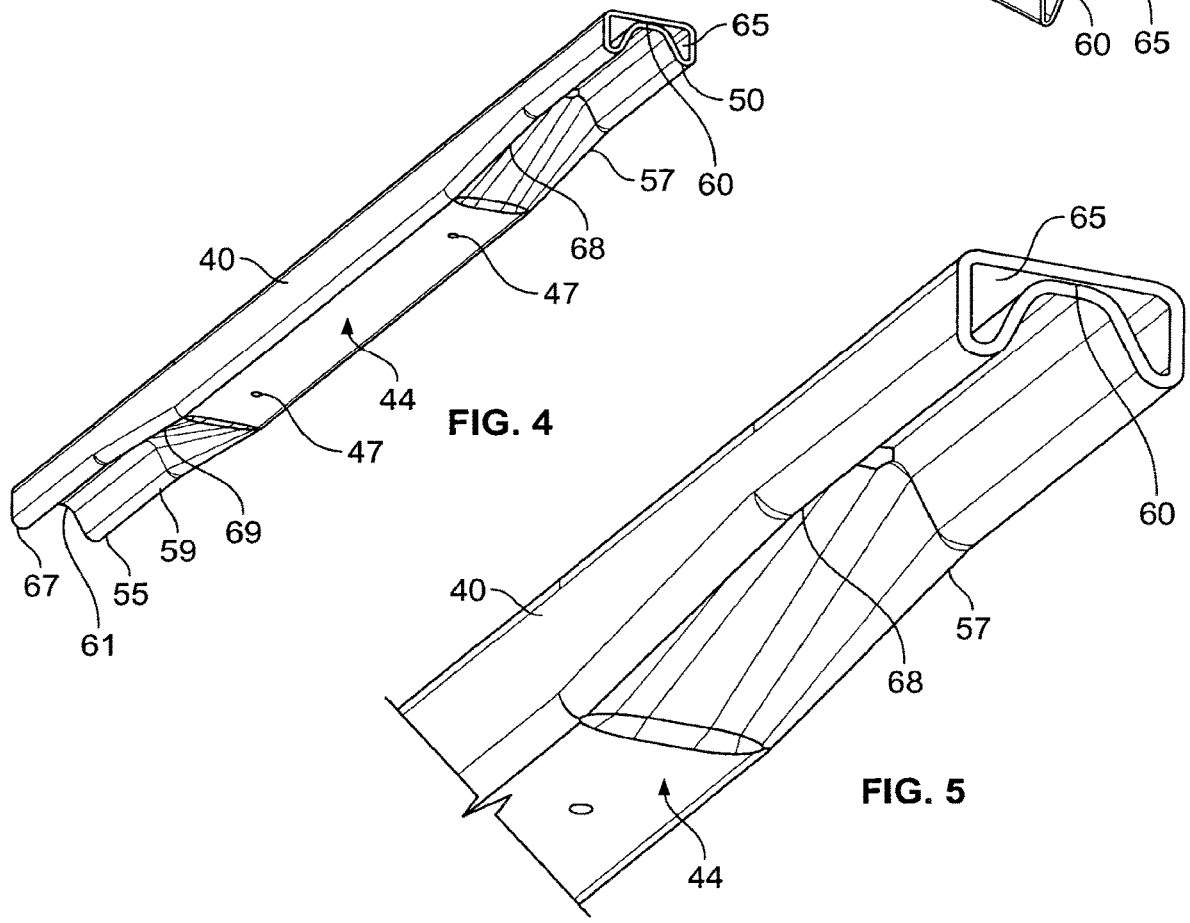

UNDER BED HITCH MOUNTING SYSTEM

CROSS-REFERENCE TO RELATED APPLICATION

This application is a continuation of U.S. patent application Ser. No. 16/685,080, filed on Nov. 15, 2019, entitled "Under Bed Hitch Mounting System," which is a continuation of U.S. patent application Ser. No. 15/459,034, filed on Mar. 15, 2017, entitled "Under Bed Hitch Mounting System," now U.S. Pat. No. 10,479,153, which is a continuation of U.S. patent application Ser. No. 13/992,331, filed Jul. 17, 2013, entitled "Under Bed Hitch Mounting System," now abandoned, which is a is a 35 U.S.C. 371 national stage application of and claims priority to International Application No. PCT/US11/63922 filed on Dec. 8, 2011, entitled "Under Bed Hitch Mounting System," which claims the benefit from U.S. Provisional Patent Application No. 61/421,156 entitled "Under Bed Hitch Mounting System" filed on Dec. 8, 2010, which are all hereby incorporated in their entirety by reference.

FIELD OF INVENTION

The present invention is generally related to a towing apparatus and, more particularly, to an under bed hitch mounting system.

BACKGROUND

Many vehicles are designed to transport freight, goods, merchandise, personal property, and other such cargo. An operator often utilizes a hitch assembly to connect a towed vehicle to a towing vehicle, e.g., connecting a trailer to a pick-up truck, to increase the capacity to transport the cargo. Many types of coupling devices have been developed for providing this connection between towing and towed vehicles.

It is well known to utilize a hitch to connect a towed vehicle to a towing vehicle. There are many different types of hitches that may be attached to the towing vehicle in a variety of ways, depending on the type of hitch used. For example, some fifth wheel hitches mount to the frame underneath the bed of the pickup truck while other fifth wheel hitches mount to an above bed mounting system.

Traditional fifth wheel hitches include a head assembly for receiving a king pin on a towed vehicle, a base having a plurality of legs, and one or more mounting rails. In some systems, the legs of the fifth wheel hitch are designed to be secured to mounting rails that are attached above the bed or on the bed of the towing vehicle. In other systems, the mounting rails may be fixed to the frame of a vehicle underneath the bed. For example, the mounting rails may be connected between two portions of a pickup truck frame underneath the truck bed. The mounting rails may include a plurality of apertures for receiving the legs of the fifth wheel hitch.

Corresponding openings may be cut in the truck bed and aligned with the apertures in the mounting rails. The legs of the fifth wheel hitch may be connected to apertures in the mounting rails through the openings in the truck bed, thereby securing the fifth wheel hitch to the frame of the vehicle. When the fifth wheel hitch is not in use, the legs may be disconnected from the apertures in the rails and the hitch may be removed from the bed of the truck. Caps may be placed over the apertures to allow the truck bed to be used for other purposes.

Traditional gooseneck hitches may also mount to a towing vehicle frame beneath the load bed of the towing vehicle. A gooseneck hitch may be designed for use in a load bed of a towing vehicle similar to a fifth wheel hitch. The difference is that the gooseneck uses a ball and coupler verses a kingpin and pin receiver. Gooseneck hitches may include a mounting plate configured to connect to the frame of the towing vehicle, a receptacle in the mounting plate configured to receive a ball hitch, and a hitch ball removably connected to the receptacle and configured to engage a coupling member of the towed vehicle. An opening in the load bed of the towing vehicle may be aligned with the receptacle in the mounting plate. This may allow the hitch ball to connect to the receptacle through the opening in the load bed of the towing vehicle. The hitch balls themselves are typically removable or retractable so that when the hitch is not in use, the hitch ball may be removed or retracted when not in use. This may generally prevent obstruction of the load bed of the towing vehicle.

Towing vehicles are generally arranged to accommodate either a fifth wheel hitch or a gooseneck hitch, but not both. To convert a towing vehicle from accommodating a fifth wheel hitch to a gooseneck hitch or vice versa is time and labor intensive and inefficient. However, since fifth wheel hitches and gooseneck hitches use different mounting configurations, traditionally only one hitch can occupy this location. Therefore, there is a need in the art for an improved apparatus for towing vehicles that may allow for selectively accommodating either a fifth wheel hitch or a gooseneck hitch.

Additionally, because the mounting rails attach to the underside of the towing vehicle, there may be significant space limitations. These space limitations may cause limitations in the mounting rails that may be used. This in turn may impact the ability to attach mounting rails to the underside of the towing vehicle, including, without limitation to the frame of the towing vehicle. Therefore, there is a need in the art for improved mounting rails.

SUMMARY

A hitch mounting system capable of attaching to a vehicle, where, the vehicle includes a frame and a load bed is disclosed. The hitch mounting system may include at least one rail, the rail being a generally continuous member, where the rail includes at least one end portion, and where the end portion is deformed in a shape capable of attaching to the frame of the vehicle. The hitch mounting system may also include at least one mounting aperture located in the rail, the mounting aperture capable of having secured thereto an accessory.

A hitch mounting system may include at least one rail, the rail being a generally continuous tubular member, where the rail includes first and second surfaces and at least one end portion on the rail, where the end portion is deformed in a shape capable of attaching to a frame of a vehicle and generally fitting between the frame and a load bed of the vehicle. The hitch mounting system may also include a receiving member attached to the rail, the receiving member capable of having secured thereto an accessory.

A hitch mounting system capable of attaching to a vehicle, where the vehicle may include a frame and a load bed is disclosed. The hitch mounting system may include at least one rail, the rail being a generally single continuous member having at least one end portion, where the end portion is deformed in a shape capable of attaching to the frame of the vehicle and generally fitting between the frame and the load bed of the vehicle. The hitch mounting system may also include at least one mounting aperture located in the rail, a channel member positioned in the aperture and attached to the rail, and an accessory attachment member selectively attached to the channel member, wherein the accessory attachment member is capable of having secured thereto an accessory.

A hitch mounting system may include at least one generally continuous tubular rail member capable of attaching to a frame of a vehicle generally below a load bed of the vehicle and a channel member attached to the rail member. The hitch mounting system may also include an accessory attachment member selectively attached to the channel member, where the accessory attachment member is capable of having secured thereto an accessory.

A hitch mounting system may include at least one rail capable of attaching to a frame of a vehicle generally below a load bed of the vehicle, at least one mounting aperture located in the rail, and a receiving member positioned in the aperture and attached to the rail. The receiving member may include a channel member positioned in the aperture and attached to the rail, where the channel member has a member top surface, and an accessory attachment member attached to the channel member by inserting the accessory attachment member into the channel member and rotating the accessory attachment member, where the accessory attachment member is capable of having secured thereto an accessory.

A hitch mounting system capable of attaching to a vehicle where the vehicle may include a frame and a load bed is disclosed. The hitch mounting system may include at least one rail capable of attaching to a frame of a vehicle generally below a load bed of the vehicle and at least one mounting aperture positioned in the top surface of the rail. The hitch mounting system may also include a channel member positioned in the aperture and attached to the rail, where the channel member has a top surface positioned generally below the load bed of the vehicle.

DESCRIPTION OF THE DRAWINGS

Operation of the invention may be better understood by reference to the following detailed description taken in connection with the following illustrations, wherein:

FIG. 3 is a perspective view of a rail of the under bed hitch mounting system.

FIG. 4 is a perspective view of the rail of the under bed hitch mounting system.

FIG. 5 is a perspective view of an end portion of the rail of the under bed hitch mounting system.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
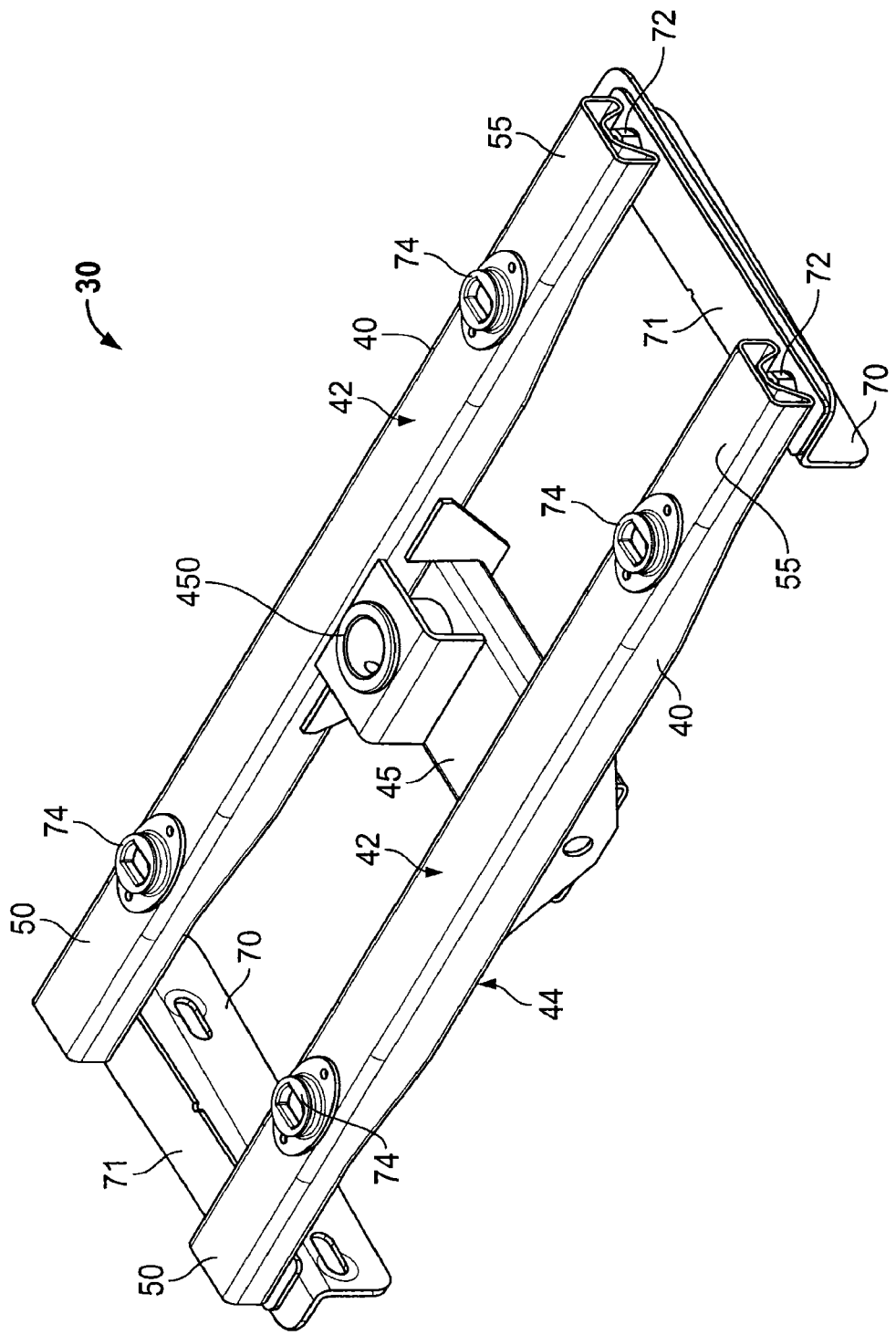
FIG. 1 is a perspective view of some embodiments of an under bed hitch mounting system.
Figure 2:
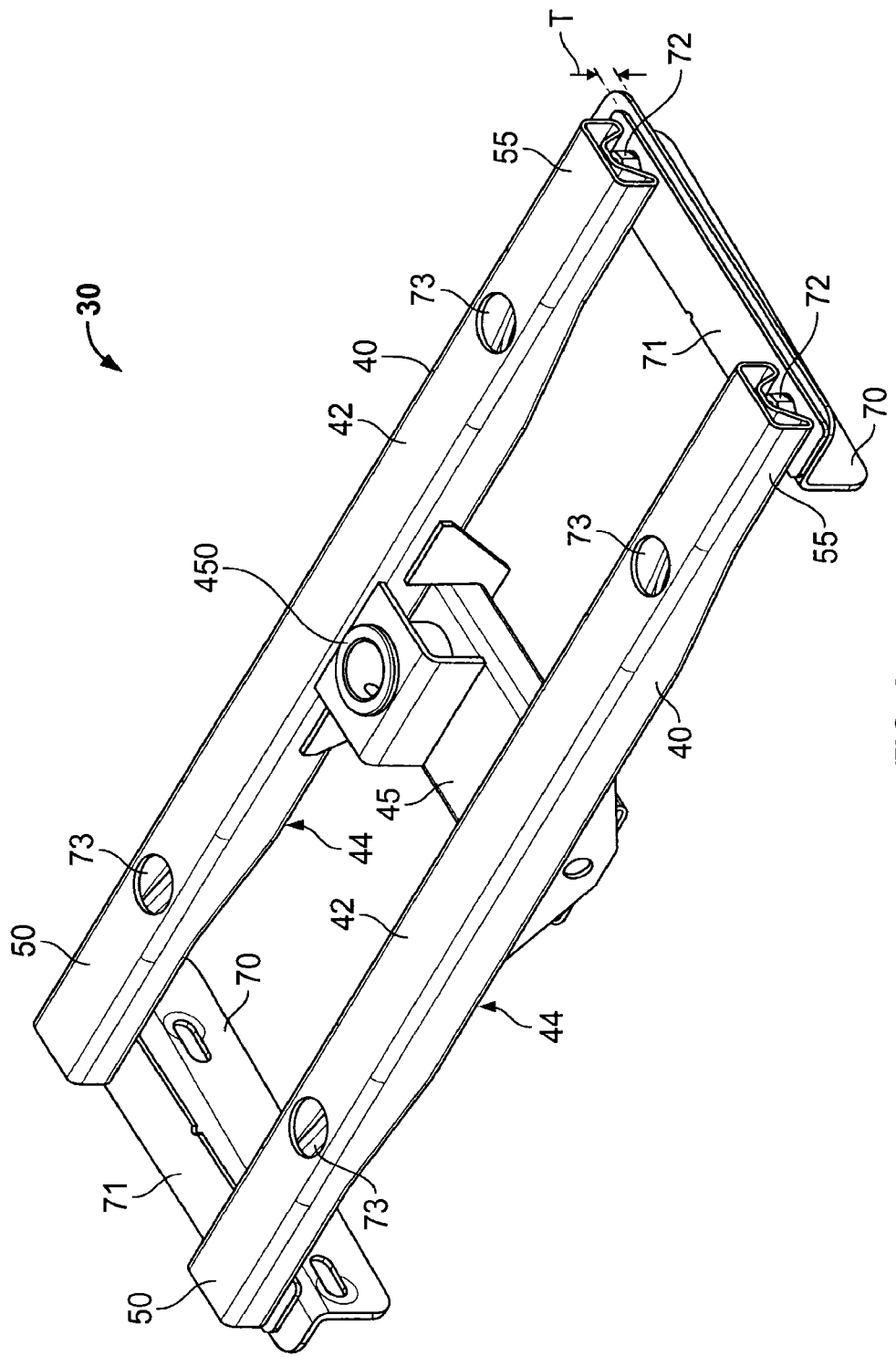
FIG. 2 is a perspective view of the under bed hitch mounting system of FIG. 1.

FIGS. 1-2 illustrate some embodiments of a hitch mounting system 30, such as an under bed hitch mounting system 30 shown in the exemplary embodiments described and shown herein. The under bed hitch mounting system 30 may be used with a towing vehicle 34 and may allow for selectively accommodating both of a fifth wheel hitch 91 and a gooseneck hitch ball 448. Although, in other embodiments, the hitch mounting system 30 may only allow for having attached thereto fifth wheel hitches and yet other embodiments the hitch mounting system 30 may only allow for having attached thereto gooseneck hitches.

Many types of gooseneck and fifth wheel hitches may be mounted to a load bed 32 of a towing vehicle 34. These types of hitches may often have at least a portion thereof mounted beneath the load bed 32 of the towing vehicle 34 in conjunction with the towing vehicle's own frame rails 36; exemplary embodiments of which are described in more detail below.

The under bed hitch mounting system 30 may include at least one rail mount or transverse member 40 and may include at least one mid rail or adapter plate 45 secured to the rail 40. By way of a non-limiting example, the under bed hitch mounting system 30 may include two rails 40 and one mid rail or adapter plate 45. The rails 40 and adapter plate 45 may be configured to support a gooseneck hitch ball 448 or a fifth wheel hitch 91, as applicable. While the under bed hitch mounting system 30 may be shown and described as having two rails 40 and one mid rail or adapter plate 45, it is to be understood that there may be any appropriate number of rails and adapter plates and it should not be limited to that shown and described herein. By way of a non-limiting example, the under bed hitch mounting system 30 may only include two rails 40 and may not include the adapter plate 45.

The rails 40 may be of any appropriate shape or size, such as having a generally tubular, square, rectangular, or the like shape, and may be sized to generally fit under the load bed 32 of the towing vehicle 34. More specifically, the rails 40 may be attached to the frame rails 36 of the towing vehicle 34. In some embodiments, the rails 40 may be formed from a single generally continuous piece, such as a generally continuous and generally rectangularly-shaped tubular member. The shape of the rails 40 may allow the rails 40 to have the ability to fit between the frame rails 36 of the towing vehicle 34 and the load bed 32 of the towing vehicle 34, which may be a generally constrained area. The rails 40 may be made from rigid material such as steel or the like. The rails 40 may include a top surface 42 and a bottom surface 44. The rails 40 may also include a first end 50 and a second end 55. The first and second ends 50, 55 may each include a deformed portion 57, 59 respectively, which may be generally positioned on the bottom surface 44.

The deformed portions 57, 59 may allow the rails 40 to generally fit between the frame rails 36 of the towing vehicle 34 and the load bed 32 of the towing vehicle 34. The deformed portions 57, 59 may be deformed in any appropriate manner. By way of a non-limiting example, the deformed portions 57, 59 may be formed by stamping, which may create a generally smooth, reinforced, tubular structure that may be capable of attaching to the towing vehicle 34.

The deformed portions 57, 59 may be of any appropriate shape and size. The shape and size may be based on the configuration of the towing vehicle 34 to which the under bed hitch mounting system 30 may be attached. In some embodiments, the deformed portions 57, 59 may be of generally the same shape and size. In other embodiments, the deformed portions 57, 59 may be of generally different shapes. The appropriate shape may depend upon the shape and size of the frame rails 36 of the towing vehicle 34 and the space between the frame 36 and load bed 32 of the towing vehicle 34.

In some embodiments, the deformed portions 57, 59 may include top bottom sides 60, 61 that may be generally folded up toward the top surface 42. This may generally form a substantially C-shape as shown in FIGS. 3-5. The folding of the deformed portions 57, 59 may form channels 65, 67, respectively. More specifically, and as shown in FIGS. 3-5, the rails 40 in some embodiments may transition from a generally full, undeformed tubular portion, to a generally C-shaped portion through first and second transition portions 68, 69, which may be positioned at the first and second ends 50, 55 of the rails 40.

Unlike the prior art, no additional rail components may be required to attach the rails 40 to the frame rails 36 of the towing vehicle 34. The rails 40 being of a generally single continuous member may generally prevent some of the structural limitations of the prior art that utilizes multiple pieces coupled together. The rails 40 of the present teachings may generally limit the presence of stress risers, which may be present in the rails of the prior art. The limitation or general reduction of the unwanted stress risers may generally improve the function of the rails 40.

The under bed hitch mounting system 30 may further include a bracket 70, which may be generally L-shaped, and a plate 71, which may be generally flat. The shape and size of the bracket 70 and plate 71 may be of any appropriate shape and size and may vary depending upon the make and model of the towing vehicle 34 to which they may be attached. The rails 40 may attach to the frame rails 36 of the towing vehicle 34 immediately under the load bed of the towing vehicle 34 by attaching the brackets 70 to the frame rails 36 of the towing vehicle 34. By way of a non-limiting example, the brackets 70 may be attached to the frame rails 36 of the towing vehicle 34 by welding, using fasteners such as nuts and bolts, or utilizing any other appropriate attachment apparatus or method.

The plate 71 may attached to the end portion 50, 55 of the rails 40 at the deformed portions 57, 59 by any appropriate manner, such as by way of a non-limiting example, welding, using fasteners such as nuts and bolts, or utilizing any other appropriate attachment apparatus or method. The thickness T of the plate 71 may generally allow for the appropriate spacing between the ends 50, 55 of the rails 40 and bracket 70 to generally accommodate the space constraints present on the underside of the towing vehicle 34. The attached combination of the flat plate 71 and the rails 40 may then be attached to the bracket 70. In some embodiments, a fastener 72 may used to attach the attached combination of the plate 71 and the rails 40 to the bracket 70. In these embodiments, the substantially C-shaped deformed portions 57, 59 may permit adequate space for attachment of the fastener 72.

Each rail 40 may include one or more sockets 73. In some embodiments, each rail 40 may include a pair of sockets 73. However, in other embodiments, the rails 40 may include any appropriate number of sockets 73. The sockets 73 may be of any appropriate shape or size, such as a generally ovular, circular or rectangular shape. The sockets 73 may be formed in the rail 40 in any appropriate manner, such as by way of a non-limiting example by piercing the rails 40 in an appropriate location. The sockets 73 may be configured to receive and support legs 83 of the fifth wheel hitch 91. The legs 83 may be secured to the rails 40 through the sockets 73 by any appropriate means, such as by fasteners, fastening systems, welding, or the like. Apertures 75 may be drilled or otherwise formed in the load bed 32 of the towing vehicle 34 that may generally correspond to the locations of the sockets 73 in the rails 40 that may be attached to the frame rails 36 of the towing vehicle 34. The fifth wheel hitch 91 may be removably connected to the sockets 73 in the rails 40 through the apertures 75 located in the load bed 32 of the towing vehicle 34 as further described herein.

In some embodiments, the sockets 73 may be shaped to attach a receiving member 74 thereto. The receiving members 74 may selectively attach the legs 83 of the fifth wheel hitch 91 to the under bed hitch mounting system 30. In these embodiments, the receiving members 74 may be mounted in the socket 73 provided in any of the rails 40. The receiving member 74 may be secured in the socket 73 by any appropriate means, such as with fasteners, welding or the like. In the some embodiments, the receiving members 74 may be welded to the sockets 73.

In some embodiments, the receiving members 74 may compromise a puck mounting system of a fifth wheel hitch 91 whereby the fifth wheel hitch 91 may be installed through four small apertures 75 in the load bed 32, such as that disclosed in U.S. Patent Application Publication No. 20100109285, entitled "UNDERBED HITCH MOUNTING SYSTEM," and that disclosed in U.S. Pat. No. 7,121,573, entitled "VEHICLE ACCESSORY MOUNTING SYSTEM," the disclosures of which are incorporated by reference herein. Utilizing a puck mounting system or the receiving member 74 may provide generally uninhibited use of the load bed 32 of the towing vehicle 34 when the fifth wheel hitch 91 is dismounted. The receiving member 74 may be of any appropriate shape or size, such as by way of a non-limiting example, a cylindrical, oval, or a square shape, but should not be limited to that shown and described herein.

Figure 6:
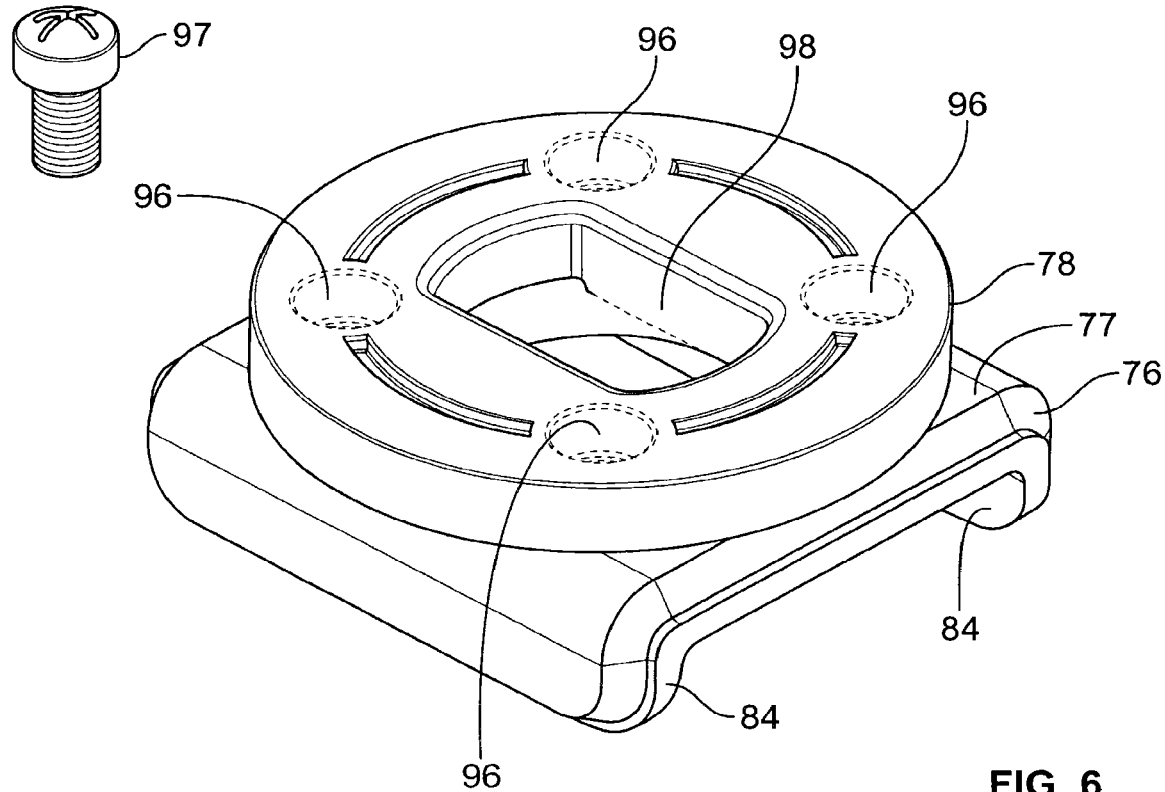
FIG. 6 is a perspective view of some embodiments of a receiving member of an under bed hitch mounting system.

As shown in FIG. 6, the receiving member 74 may include a channel member 76 and a puck member 78. The channel member 76 may be shaped to fit within the sockets 73 such that it has a top surface 77 flush or substantially flush with the top surface 42 of the rails 40. The channel members 76 may then be welded to the top surface 42 of the rails 40. This may permit attachment of the receiving member 74 to the rails 40 without having to access the underside of the load bed 32 of the towing vehicle 34 as may be required in the prior art. This may make attaching the receiving members 74 to the rails 40 generally easier to accomplish.

Figure 7:
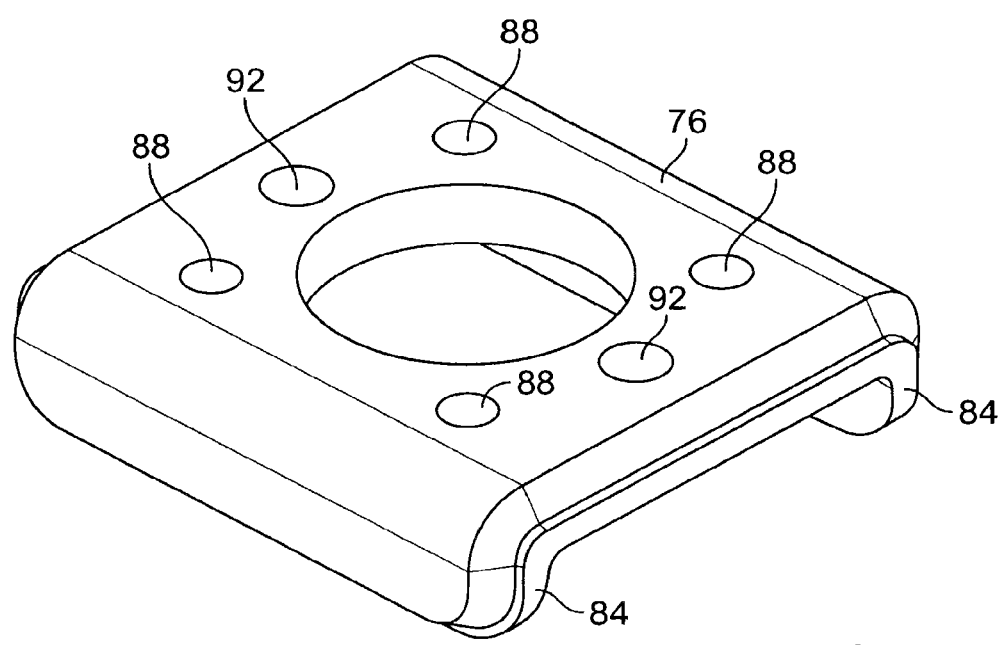
FIG. 7 is a perspective view of some embodiments of a channel member of an under bed hitch mounting system.
Figure 8A:
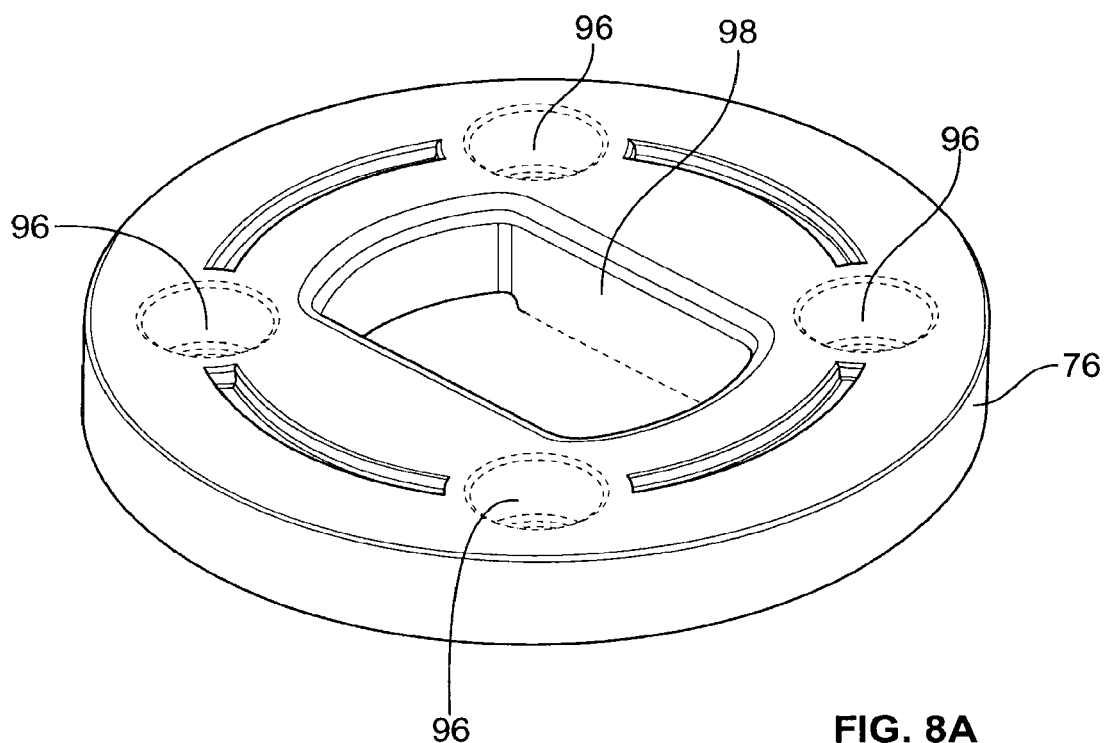
FIG. 8A is a perspective view of some embodiments of a puck member of an under bed hitch mounting system.
Figure 8B:
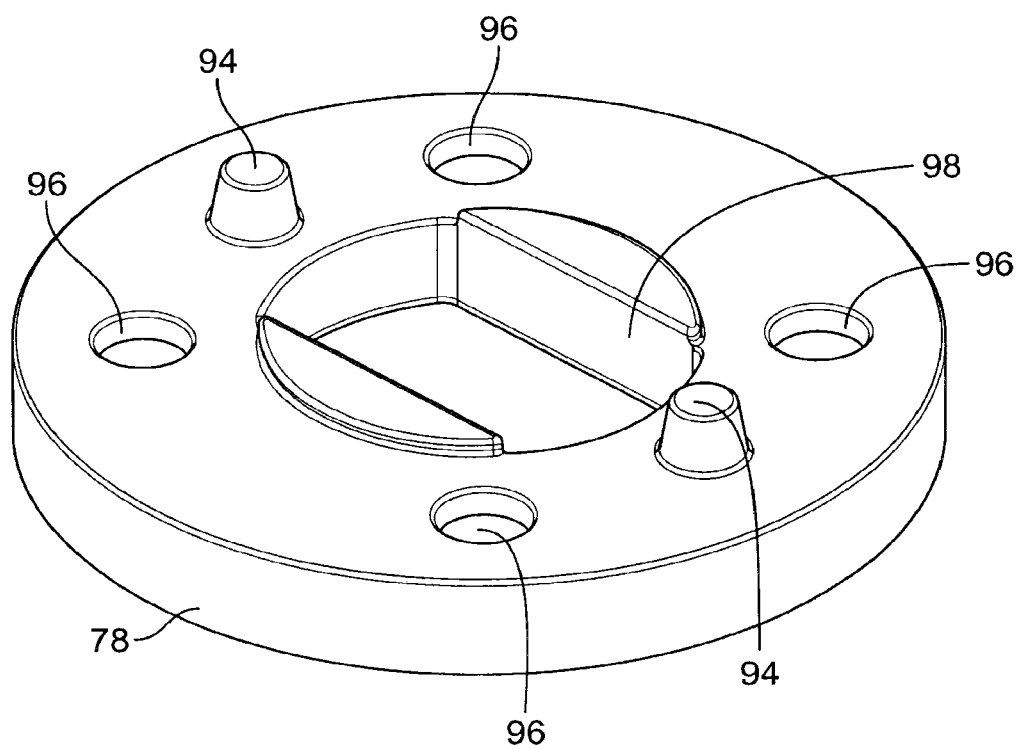
FIG. 8B is a perspective view of other embodiments of a puck member of an under bed hitch mounting system.

The channel member 76 shown in FIGS. 6-7 may include a pair of legs 84 that may be of a shape and size to generally permit the channel member 76 to fit within the socket 73 so that the top surface 77 of the channel member 76 may be generally flush or substantially flush with the top surface 42 of the rails 40. The channel member 76 may, however, not include the legs 84. If the depth of the sockets 73 in the rails 40 is less, the legs 84 may not be necessary. If, on the other hand, the depth of the sockets 73 in the rails is greater it may be necessary to include the legs 84.

In some embodiments, the channel member 76 may include a plurality of bolt apertures 88 and a pair of locator apertures 92. The puck member 78 may include a pair of nubs 94, a plurality of bolt apertures 96 and a center section recess 98, such as an aperture or slot. The nubs 94 of the puck member 78 may engage with the locator apertures 88 of the channel member 76 so that the puck member 78 may be generally oriented in the proper position on the channel member 76 during installation. Further, the engaging of the nubs 94 with the locator apertures 92 may position the bolt apertures 88 of the channel members 76 with the bolt apertures 96 of the puck member 78. A fastener 97 of any appropriate shape and size may then be inserted into the bolt apertures 96 and 88 so that the puck member 78 may attach to the channel member 76.

The puck member 78 may be of a size and shape so that it may generally fit flush or substantially flush with the load bed 32 of the towing vehicle 34 in which it may be installed. Different thickness puck members 78 may be used to account for the varying thicknesses of load beds of various towing vehicles, i.e., the puck member 78 may be of an appropriate thickness based upon the distance between the load bed 32 and the frame rails 36 of the particular towing vehicle 34 to which the under bed hitch mounting system 30 may attach. Additionally, the puck member 78 may have a thickness that may generally account for a bed liner installed onto the load bed 32 of the towing vehicle 34 so that the puck member 78 may generally remain flush or substantially flush with the bed liner.

The center recessed section 98 may be of a shape and size to receive an accessory member 101 such as a T-bolt 103 having a handle 105. Any number or variety of accessory members 101 may be utilized with the receiving members 74. The accessory member 101 may be any appropriate or desired type of object, such as a cap, a safety chain tie down member, fifth wheel hitch or the like. By way of a non-limiting example, caps may be placed over the receiving members 74 or apertures 75 in the load bed 32 when the fifth wheel hitch 91 is not in use. In these embodiments, the accessory member 101 may also attach the legs 83 of the fifth wheel hitch 91 to the rails 40. The fifth wheel hitch 91 may be positioned onto the load bed 32 of the towing vehicle 34 so that the legs 83 may generally align with the sockets 73 and in particular the receiving members 74. The appropriate accessory member 101 may then be inserted into the receiving members 74. The accessory member 101 may then be rotated to secure the appropriate items, such as by way of a non-limiting example; legs 83 of the fifth wheel hitch 91 to the rails 40. In particular, the handle 105 may only need to be turned one-quarter revolution and then the T-bolt 110 may engage the receiving member 74 to secure the legs 83 of the fifth wheel hitch 91 to the receiving member 74 of the rails 40. It should be understood, however, that any type of accessory member can be used and is not limited to that shown or described herein.

Additional embodiments of an under bed hitch mounting system according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired under bed hitch mounting system without departing from the spirit and scope of the present teachings.

Figure 9:
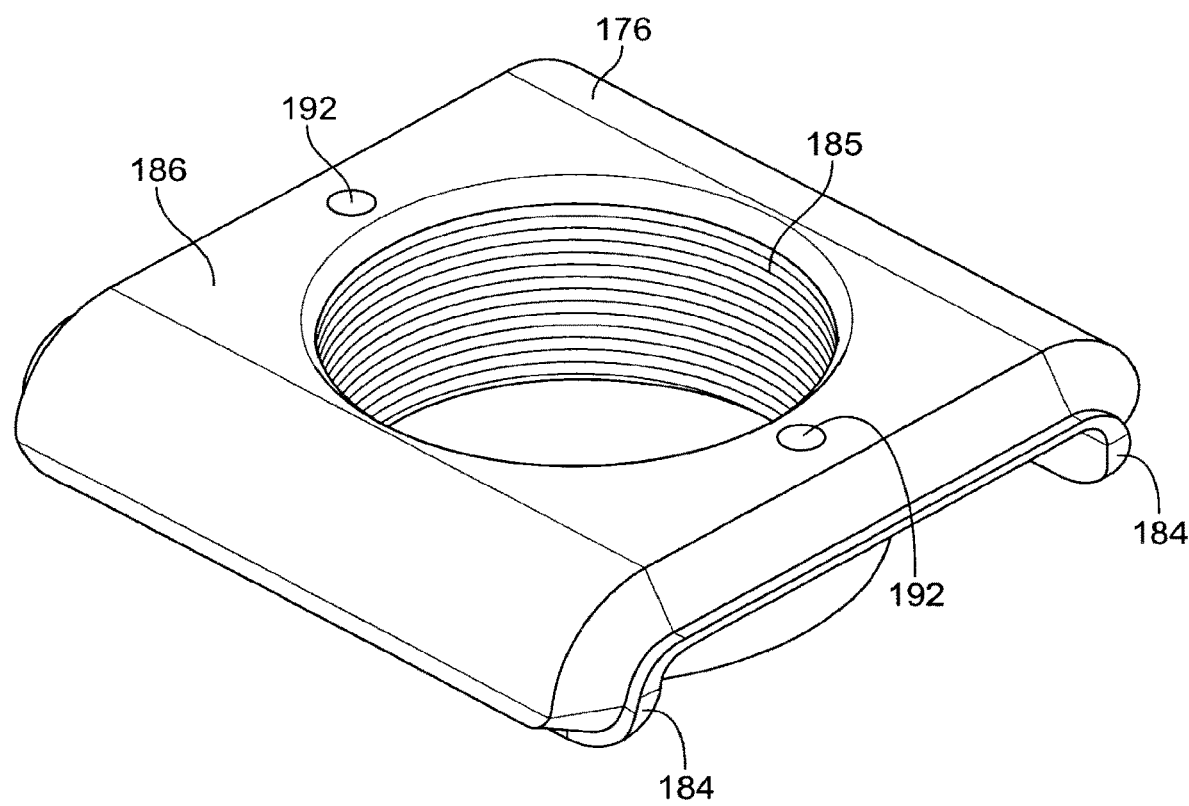
FIG. 9 is a perspective view of other embodiments of a channel member of an under bed hitch mounting system.
Figure 10:
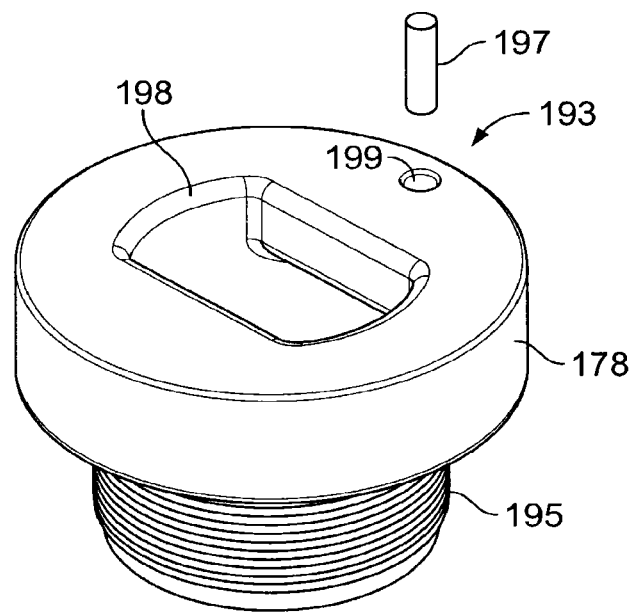
FIG. 10 is a perspective view of other embodiments of a puck member of an under bed hitch mounting system.

In other embodiments shown in FIGS. 9-10, the receiving member 174 may include a channel member 176 and a puck member 178. The receiving member 174 or more specifically, the channel member 176 may include a pair of legs 184 that may be of a shape and size to permit the channel member 176 to generally fit within the socket 73 so that a top surface 186 of the channel member 176 may be flush or substantially flush with the top surface 42 of the rails 40. It, however, is not necessary to include the legs 184 depending upon the size and shape of the rails 40 and the thickness of the channel member 176 as previously mentioned.

The channel member 176 may further include a pair of locator apertures 192 and a threaded portion 185. The puck member 178 may include an anti-rotation mechanism 193 such as a locking pin 197 as shown in FIG. 10, a male-threaded portion 195 and a center section recess 198. In these embodiments, the puck member 178 may be attached to the channel member 176 by engaging the threads 195 of the puck member 178 with the threads 185 of the channel member 178. The threads 185 may matingly engage the threads 195, which may secure the puck member 178 to the channel member 176.

To ensure that the puck member 178 is not easily removed from the channel member 176, an anti-rotation mechanism 193 may be used. In these embodiments, the anti-rotation member may include a locking pin 197 and a corresponding aperture 199 in the puck member 178. The locking pin 197 may fit into the aperture 199 via an interference fit. The locking pin 197 may be pushed into the aperture 199. Next, the puck member 178 may be rotated until fully seated and then rotated in an opposite direction until the locking pin 197 may engage the locator aperture 192. Once the locking pin 197 may be so engaged with the locator aperture 192, the locking pin 197 may be pushed into engagement with the locator aperture 192 via the interference fit. The anti-rotation mechanism 193 may generally prevent further rotation and thus removal of the puck 178 from the channel member 176.

The center recess section 198 may be of a shape and size to receive any appropriate accessory member 101 such as the T-bolt 103 having a handle 105. Any number or variety of accessory members 101 may be utilized with the receiving members 174.

Figure 11:
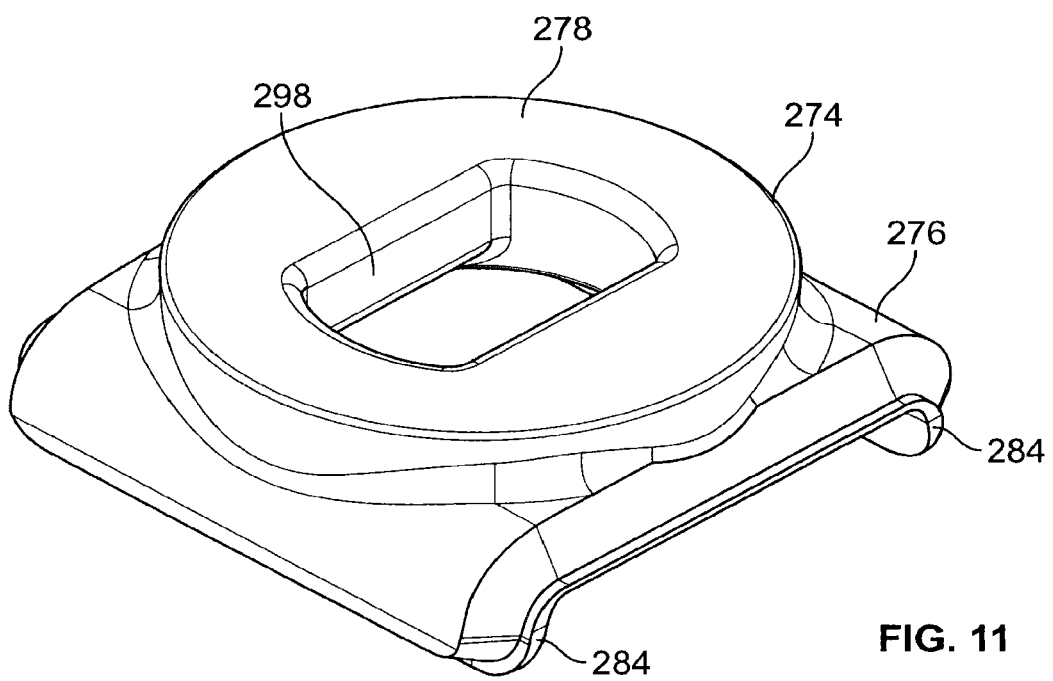
FIG. 11 is a perspective view of other embodiments of a receiving member of an under bed hitch mounting system.

In other embodiments shown in FIG. 11, a receiving member 274 may be of a one-piece integral construction. In these embodiments, the receiving member 274 may include a channel portion 276 and a puck portion 278, which may be integrally formed with one another. The channel portion 276 may include a pair of legs 284, which may be optional as previously discussed. The legs 284 may be of a shape and size to permit the channel portion 276 to fit within the socket 73 so that a top surface 286 of the channel portion 276 may be flush or generally flush with the top surface 42 of the rails 40. It, however, is not necessary to include the legs 284 depending upon the size and shape of the rails 40 and the thickness of the channel portion 276.

The receiving member 274 may be formed by casting, forging, or any other appropriate process. As the receiving member 274 may be integrally formed, the receiving member 274 may not require any kind of mechanism to ensure that the channel portion 276 and puck portion 278 are aligned properly as they may be formed generally properly aligned.

The center recess section 298 may be of a shape and size to receive an accessory member 101 such as a T-bolt 103 having a handle 105. Any number or variety of accessory members 101 may be utilized with the receiving members 274. The accessory member 101 may be any appropriate or desired type of object, such as a cap or a safety chain tie down member.

Figure 12:
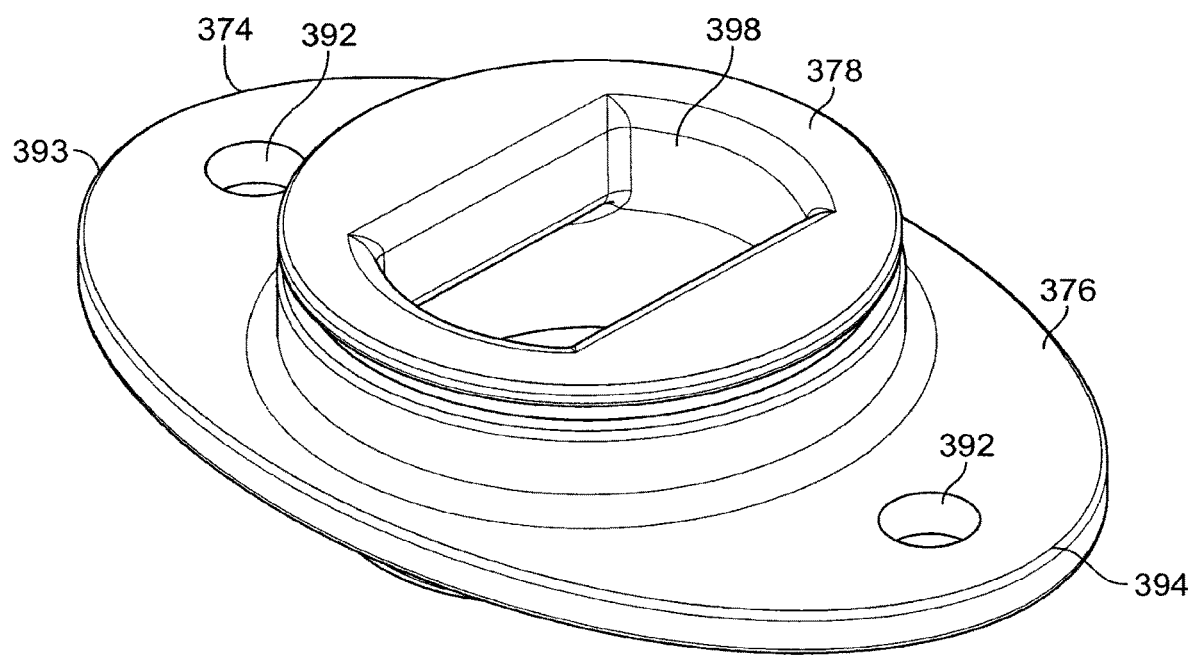
FIG. 12 is a perspective view of other embodiments a receiving member of an under bed hitch mounting system.
Figure 13:
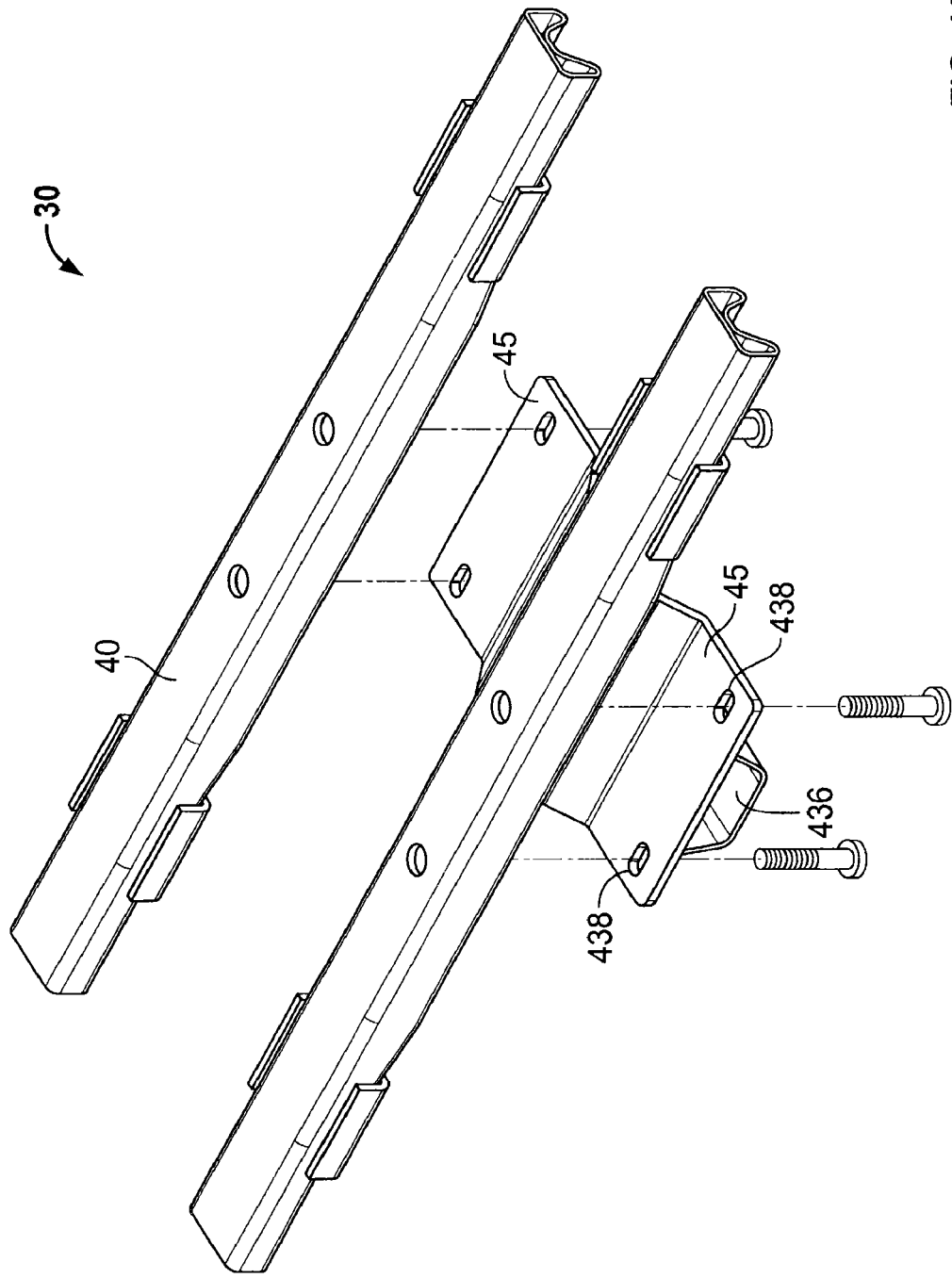
FIG. 13 is a perspective and partially exploded view of other embodiments of an under bed hitch mounting system.
Figure 14:
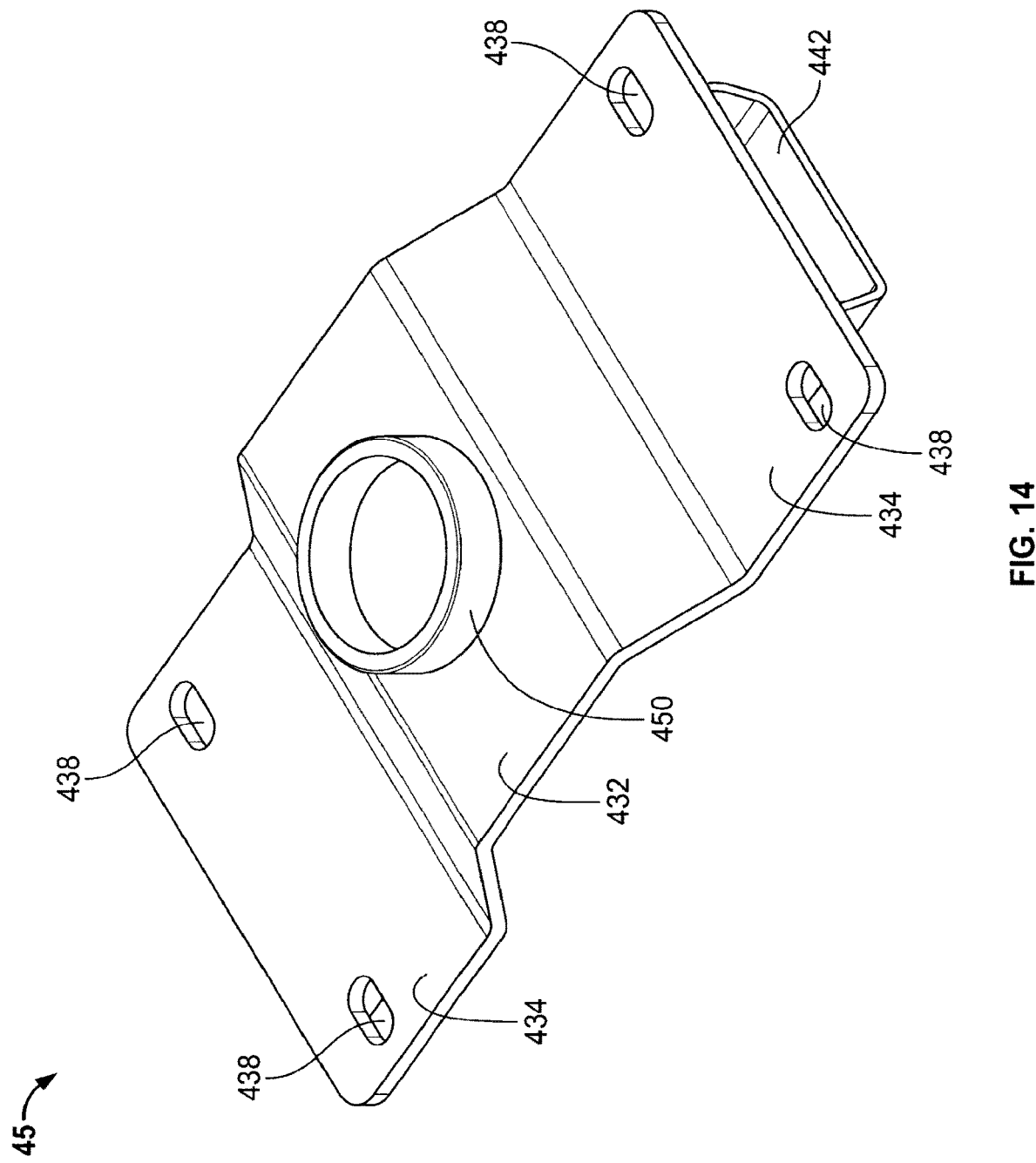
FIG. 14 is a perspective view of some embodiments of an adapter plate of an under bed hitch mounting system.
Figure 15:
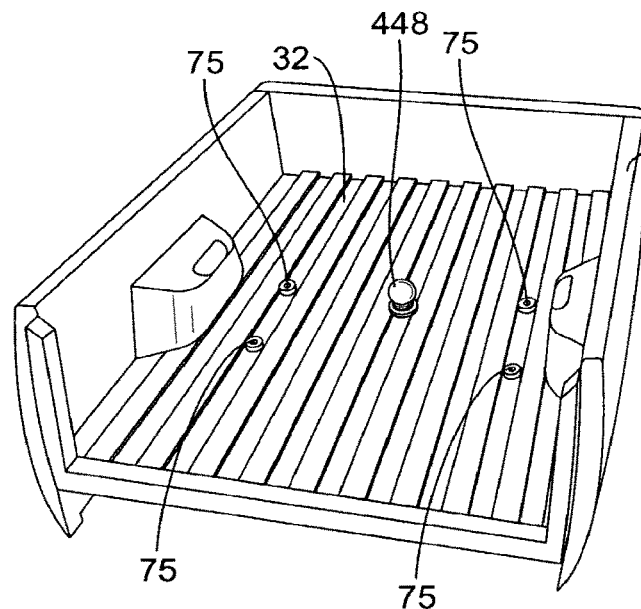
FIG. 15 is a rear perspective view a towing vehicle having an under bed hitch mounting system attached to a frame below a load bed of the towing vehicle with a gooseneck hitch attached.
Figure 16:
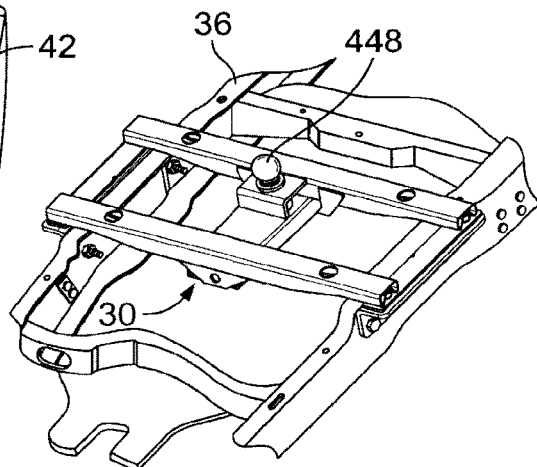
FIG. 16 is a rear perspective view of a frame of a towing vehicle with an under bed hitch mounting system attached to the frame with a gooseneck hitch attached.
Figure 17:
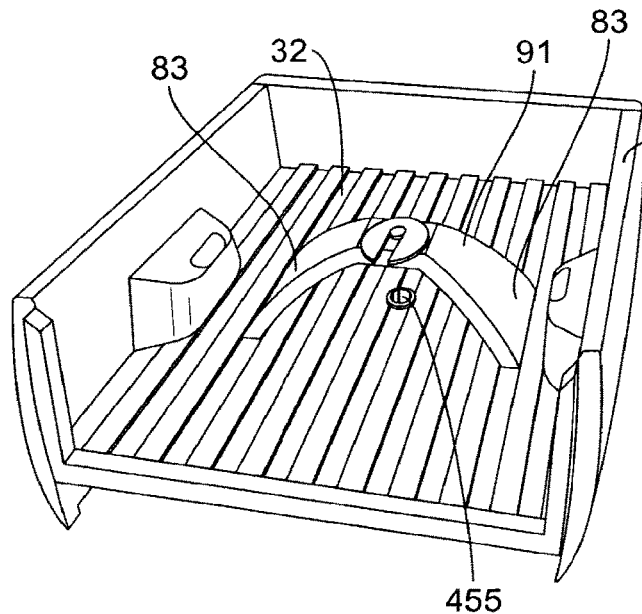
FIG. 17 is a rear perspective view of a towing vehicle having an under bed hitch mounting system attached to a frame below a load bed of the towing vehicle with a fifth wheel hitch attached.
Figure 18:
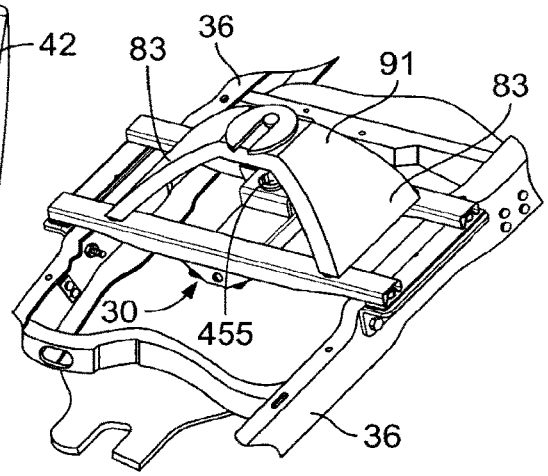
FIG. 18 is a rear perspective view of a frame of a towing vehicle with an under bed hitch mounting system attached to the frame with a fifth wheel hitch attached.
Figure 19:
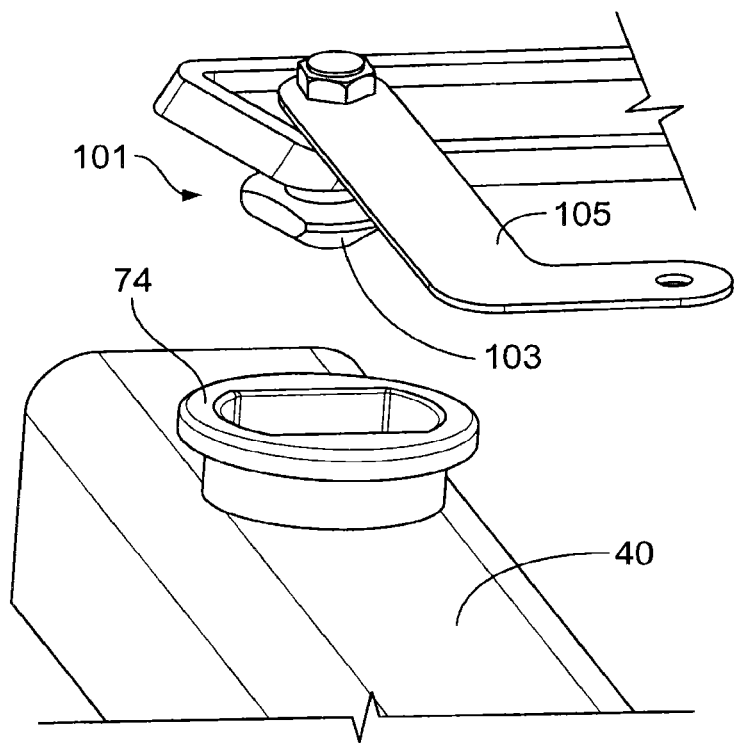
FIG. 19 is a detailed view of a receiving member of an under bed hitch mounting system and an accessory member.
Figure 20:
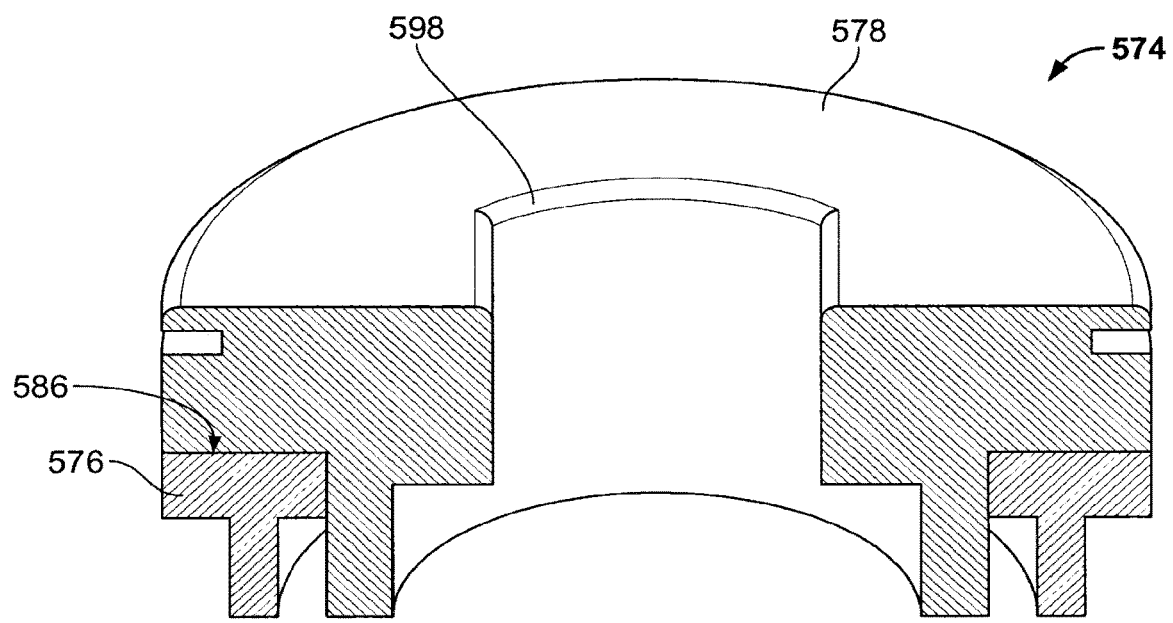
FIG. 20 is a cross-sectional view of other embodiments of a receiving member of an under bed hitch mounting system in an unlocked position.
Figure 21:
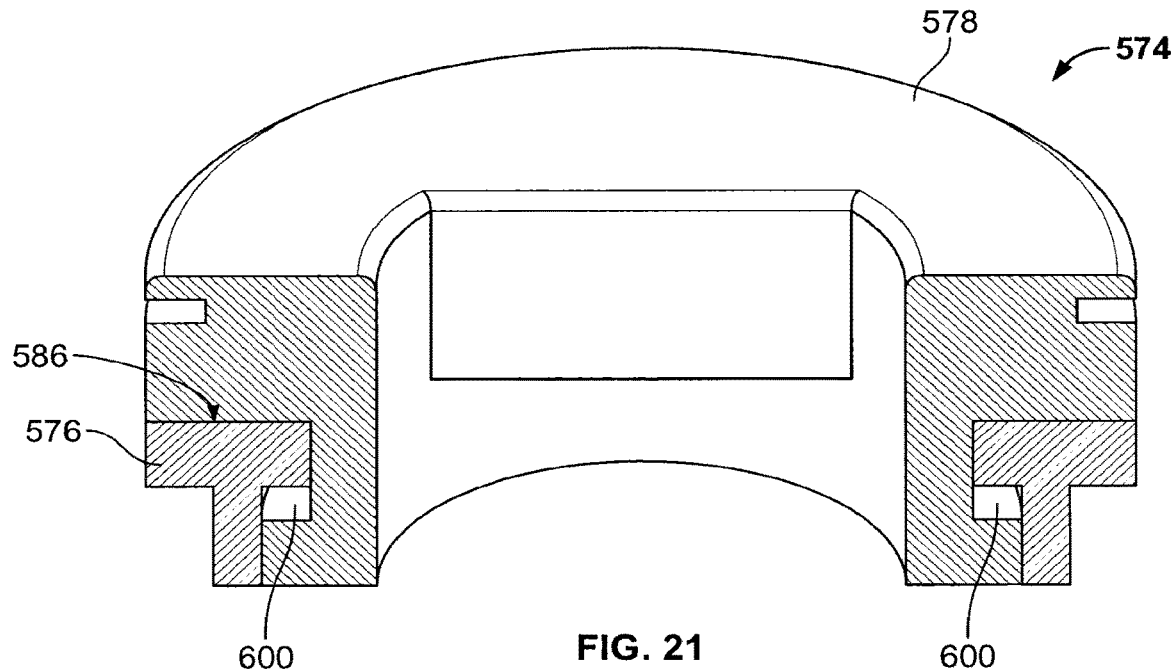
FIG. 21 is a cross-sectional view of other embodiments of the receiving member of an under bed hitch mounting system in a locked position.
Figure 22:
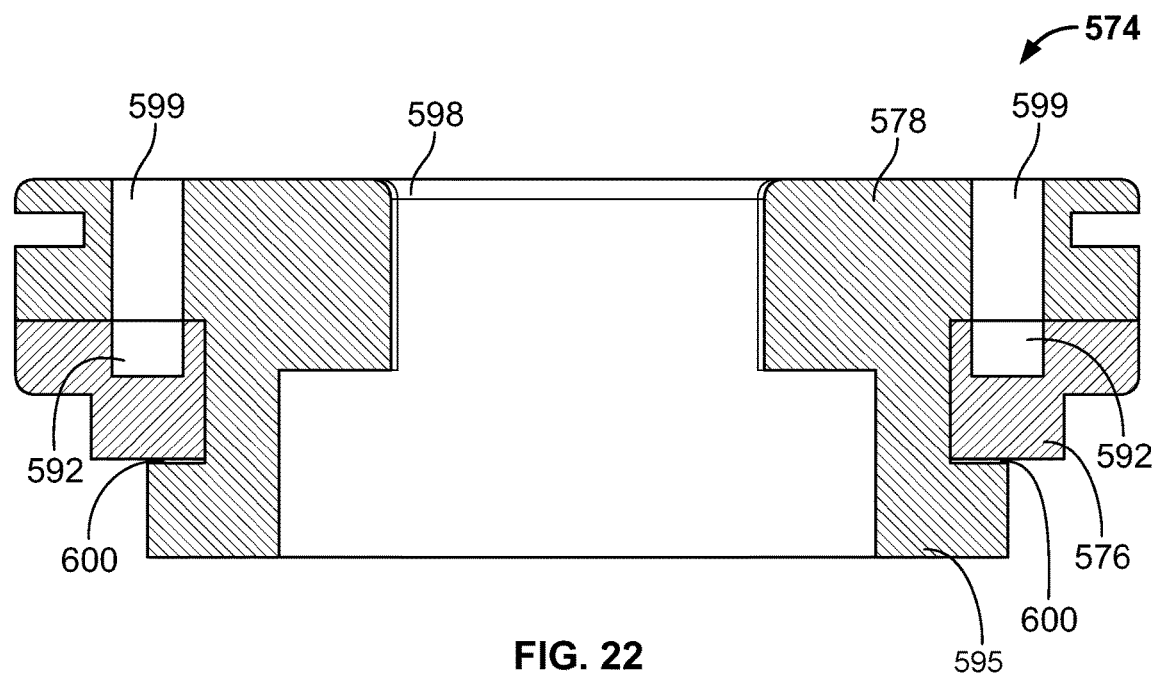
FIG. 22 is a cross-sectional view of other embodiments of a receiving member of an under bed hitch mounting system in a locked position.
Figure 23:
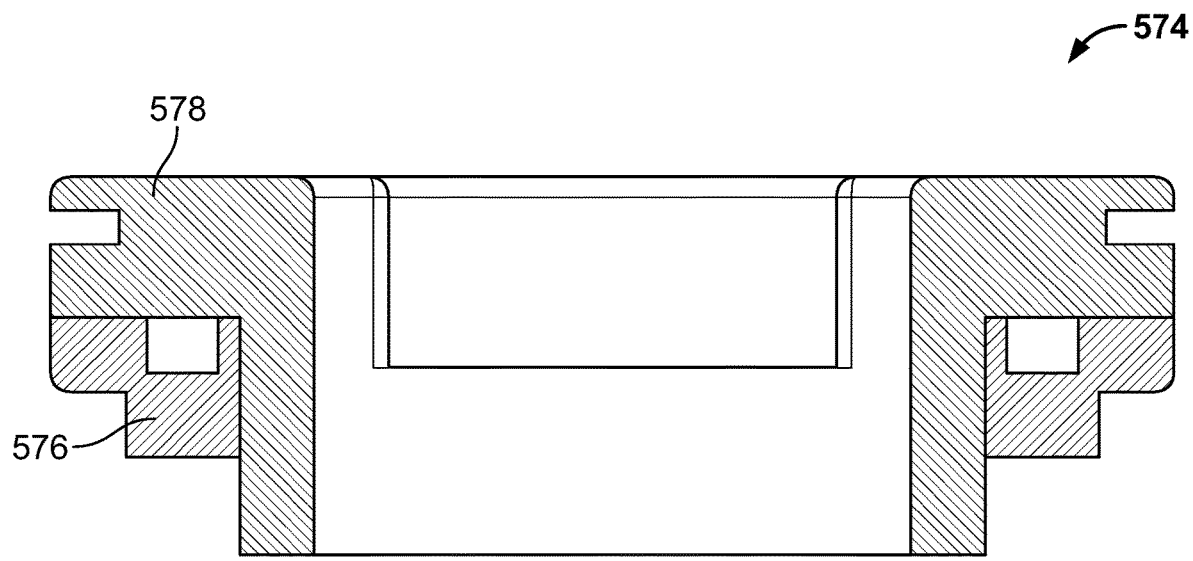
FIG. 23 is a cross-sectional view of other embodiments of the receiving member of an under bed hitch mounting system in an unlocked position.

In other embodiments in FIG. 12, a receiving member 374 may include an attachment portion 376 and a puck portion 378. Similar to the previously mentioned embodiments, the receiving member 374 may be a one-piece integrally formed body. The receiving member 374 may be formed by forging, casting or any other appropriate method. The attachment portion 378 may include a pair of flanges 381 and a pair of locating apertures 392. The flanges 381 may be substantially flat and may cause the attachment portion 378 to be a substantially oval shape having a first end portion 393 and a second end portion 394. In these embodiments, attachment portion 378 may be placed on the top surface 42 of the rails 40 over the sockets 73. The attachment portion 378 may then be welded to the top surface 42 of the rails 40. More specifically, the circumference of the attachment portion 378, less the first end portion 393 and the second portion 394, may be welded to the top surface 42 of the rails 40. The first and second end portions 393, 394 may not be welded to allow for some flexibility in the receiving member 374. Having the flexibility may generally prevent or limit unwanted stress risers and strain on the receiving member 374 and the rails 40. The locating apertures 392 may be used during the manufacturing process to help orient the center section recess 398 that may be located in the puck portion 378.

In other embodiments, the attachment portion 378 may be attached to the rail 40 along any location accessible via the load bed 32 of the towing vehicle 34. It may not be necessary to use the sockets 73 to attach the receiving member 374 in these embodiments. The attachment portion 378 may be welded to the top surface 42 of the rails 40. This structure may take loading away from the rails 40.

The center recess section 398 may be of a shape and size to receive an accessory member 101 such as a T-bolt 103 having a handle 105. Any number or variety of accessory members 101 may be utilized with the receiving members 374. The accessory member 101 may be any appropriate or desired type of object, such as a cap or a safety chain tie down member.

In those embodiments that may utilize the gooseneck hitch ball 448, the under bed hitch mounting system 30 may utilize the mid rail or adapter 45; exemplary embodiments of which are shown in FIGS. 13-16. The mid rail or adapter plate 45 may be of any appropriate shape or size, such as a generally rectangular or tubular shape that may generally span the length between the rails 40. The mid rail or adapter plate 45 may be configured to connect to the rails 40. The mid rail or adapter plate 45 may be attached to the rails by any appropriate means, such as with fasteners, welding or the like.

The adapter plate 45 may be of a generally one piece construction or may include several sections that may be secured together. The adapter plate 45 may include a center section 432 and one or more mounting sections 434 extending therefrom. By way of a non-limiting example, there may be two mounting sections 434. As an alternative, there may be no mounting sections 434, such that the center section 432 may be attached directly to the rails 40.

The center section 432 may be located between the mounting sections 434. The mounting sections 434 may extend at a downward angle and away from the center section 432, such that the center section 432 may be positioned above the mounting sections 434. The mounting sections 434 may extend in opposite directions away from the center section 432.

The mounting sections 434 may engage the rails 40 at any appropriate location, such as the underside 44 of the rails 40. The mounting sections 434 may be configured to connect to the rails 40 by any appropriate means, such as with fasteners, welding or the like. When the adapter plate 45 may be connected to the rails 40, the center section 432 may be approximately flush with and parallel to the rails 40. When the mounting section 434 may engage the rails 40, the mounting sections 434 may be approximately parallel to the rails 40. Each mounting section 434 may include one or more openings or rail mounting apertures 438. The mounting apertures 438 may be configured to align with mounting apertures 47 in the rails 40, shown in FIG. 4. The mounting apertures 438 may be of any appropriate shape or size, such as a generally circular, ovular or rectangular shape.

The adapter plate or mid rail 45 may also include a base member 442. The base member 442 may be of any appropriate shape or size, such as a generally square, rectangular or tubular shape. The base member 442 may be attached to the bottom of the adapter plate or mid rail 45. The base member 442 may be attached to the mid rail 45 by any appropriate means, such as by welding, fasteners or the like. The base member 442 may also be secured to the rails 40, such as on the underside 44 of the rails 40.

The adapter plate or mid rail 45 may be configured to receive a hitch ball 448. By way of a non-limiting example, the center section 432 may include a hitch ball socket 450 that may be configured to receive the hitch ball 448. The hitch ball socket 450 may be of any appropriate shape or size, such as a generally cylindrical shape. The hitch ball socket 450 may be located at any appropriate position on the adapter plate 45, such as the approximate center of the adapter plate 45. By way of a non-limiting example, the hitch ball socket 450 may be configured to receive a removable hitch ball 448 with spring-loaded ball bearings. It should be appreciated, however, that the receptacle 450 may be configured to receive any appropriate type of hitch ball 448 and should not be limited to that shown or described herein.

Apertures may be drilled in the load bed 32 of the towing vehicle 34 that may generally correspond to the locations of the sockets 73 in the rails 40 and the hitch ball socket 450. A fifth wheel hitch may be removably connected to the sockets 73 in the rails 40 through the apertures located in the load bed 32. A hitch ball 448 may be removably connected to the hitch ball socket 450 through the aperture 455 in the load bed 32, whereby a gooseneck hitch may be utilized.

In other embodiments shown in FIGS. 20-24, a receiving member 574 may include a channel member 576 and an accessory attachment member or puck member 578. In some embodiments, the receiving member 574 or more specifically, the channel member 576 may include a pair of legs that may be of a shape and size to permit the channel member 576 to generally fit within the socket 73 so that a top surface 586 of the channel member 576 may be generally flush or substantially flush with the top surface 42 of the rails 40. In other embodiments, the channel member 576 may not include legs. In these embodiments, however, the channel member 576 may be attached to the rails 40 by any appropriate method, such as by way of a non-limiting example, welding, using fasteners, or the like.

Once attached, the channel member 567 may be generally shorter than the bottom side of the load bed 32 of the towing vehicle 34. This may result in being capable of attaching the under bed hitch mounting system 30 with the channel member 576 being attached to the towing vehicle 34 and not having to create apertures in the load bed 32 if they may be undesired. In addition, certain of the apertures may not be needed if only a gooseneck option was chosen, i.e., only needing three of the five apertures.

Figure 24:
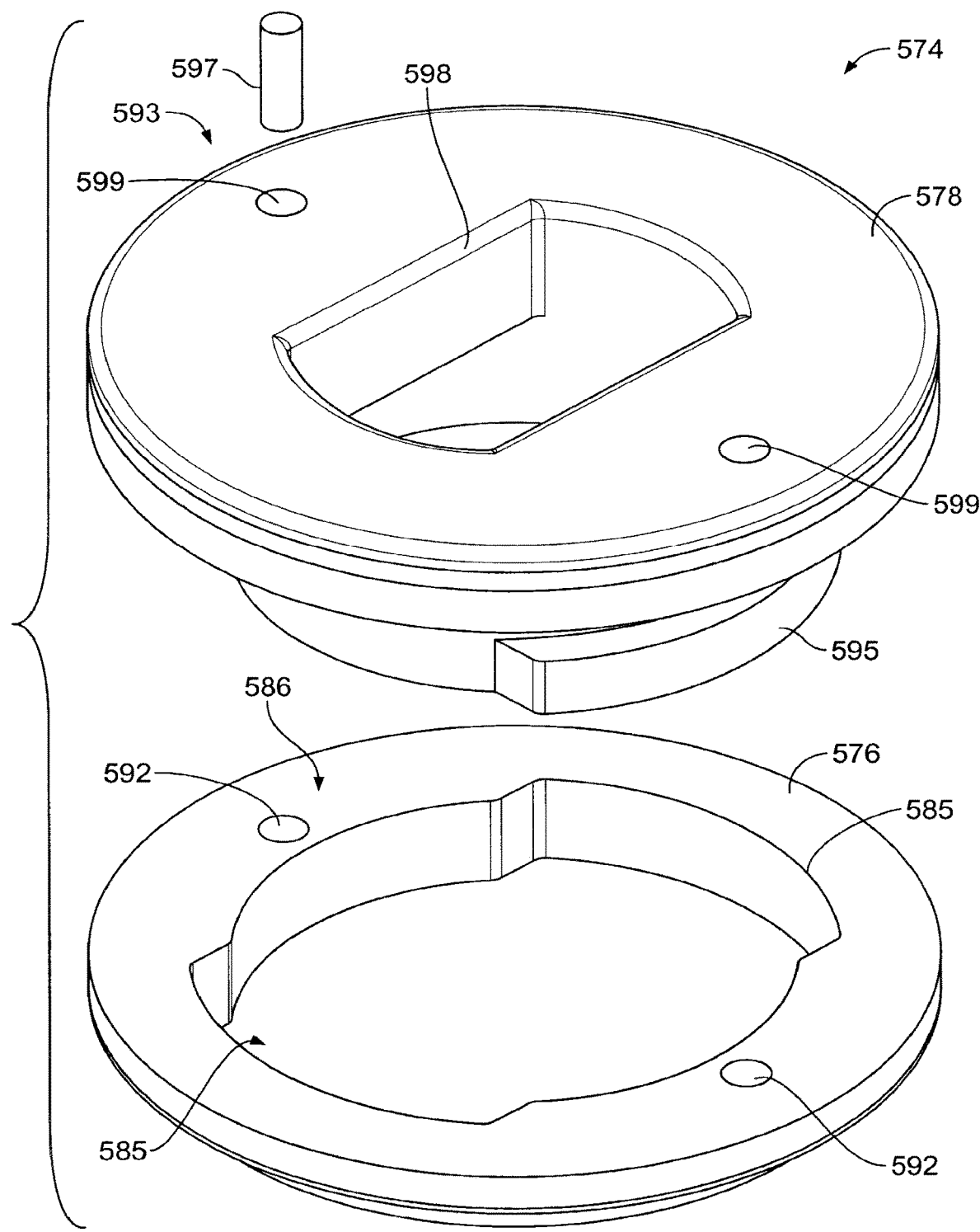
FIG. 24 is a perspective view of other embodiments of the receiving member disassembled.

The channel member 576 may further include a pair of locking apertures 592 and a recessed portion 585. In some embodiments, the channel member 576 may include a pair of recessed portions 585 as shown in FIG. 24. The puck member 578 may include a locking mechanism 593 such as a locking pin 597 as shown in FIG. 24, a flange 595 and a center section recess 598. In some embodiments, the puck member 578 may include a pair of flanges 595 that may be correspondingly shaped and sized to the recessed portions 585 of the channel member 576. In these embodiments, the puck member 578 may be attached to the channel member 576 by generally aligning the flanges 595 with the recessed portions 585 and inserting the puck member 574 relative to the channel member 576. This may secure the puck member 578 to the channel member 576.

More specifically, the channel member 576 may include a channel 600 positioned therein. Once the puck member 578 may be inserted into the channel member 576 and rotated, the flanges 595 of the puck member 578 may be rotated to be positioned within the channel 600, which may generally prevent the puck member 578 from being removed. In these embodiments, the puck member 578 may be rotated approximately a quarter turn, i.e., 90 degrees, to be locked into place. As shown in FIGS. 20-23, the flanges 595 may become generally misaligned with the recess portions 585 and the flanges 595 may engage the channel 600 of the channel member 576 selectively attaching the puck member 578 to the channel member 576.

To ensure that the puck member 578 is not generally capable of being removed from the channel member 576, the locking mechanism 593 may be used. In these embodiments, the locking mechanism 593 may include the locking pin 597 and a corresponding aperture 599 in the puck member 578. Any appropriate number of apertures 599 may be used, e.g., one, two, three, etc. In addition any number of locking pins 597 may be used, e.g., one, two, three etc. Still further, the number of apertures 599 may match the number of locking pins 597 utilized or the numbers of apertures 599 and locking pins 597 may not be the same. The locking pin 597 may fit into the aperture 599 via an interference fit. The locking pin 597 may be pushed into the aperture 599. Next, the puck member 578 may be rotated, e.g., 90 degrees, until fully seated wherein the locking pin 597 may engage the locking aperture 592. Once the locking pin 597 may be so engaged with the locking aperture 592, the locking pin 597 may be pushed into engagement with the locking aperture 592 via the interference fit. The locking mechanism 593 may generally prevent further rotation and thus removal of the puck member 578 from the channel member 576.

The center recess section 598 may be of a shape and size to receive any appropriate accessory member 101 such as a T-bolt 103 having a handle 105. Any number or variety of accessory members 101 may be utilized with the receiving members 574. The accessory member 101 may be any appropriate or desired type of object, such as a cap or a safety chain tie down member.

As mentioned above the installer may use the receiving member 574, or at least the channel member 576, in the towing vehicle and may not have to pre-drill any apertures in the load bed 32. In addition, the receiving member 574 may include a puck member 578 that may be of the appropriate configuration for the applicable use, and different thickness puck members 578 may be used depending upon the towing vehicle to which the under bed hitch mounting system 30 may be attached. Further, different puck members may have additional features designed therein, including, without limitation including a trim ring feature.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. By way of non-limiting example, other accessories may be attached to the vehicle utilizing the under bed hitch mounting system 30, such as bike racks, ramps, storage containers, etc. The claims as follows are intended to include all modifications and alterations insofar as they come within the scope of the claims or the equivalent thereof.

Having thus described the invention, I claim:

1. A hitch mounting system comprising:
   at least one rail configured to fit between a frame and a load bed of a vehicle and configured to attach with the frame, wherein the at least one rail is a tubular member having a cross-sectional shape defined by an enclosed peripheral wall with a generally hollow section;
   at least one mounting aperture located in the rail;
   a channel member positioned in the mounting aperture and attached to the rail;
   an accessory attachment member attached to the channel member, wherein the accessory attachment member is capable of having an accessory mounting member secured thereto, wherein the channel member includes at least one recess and the accessory attachment member includes at least one flange whereby the flange is insertable into the recess; and
   a locking mechanism generally preventing the accessory attachment member from being removed from the channel member, wherein the locking mechanism further comprises:
   a locking pin;
   a first locking aperture positioned in the accessory attachment member; and
   a second locking aperture positioned in the channel member, wherein the locking pin is capable of being inserted through the locking aperture and engaging the second locking aperture generally preventing the accessory attachment member from being removed from the channel member.

2. The hitch mounting system of claim 1 further comprising a mid-rail attached to the rail, wherein the mid-rail includes a hitch ball socket, the hitch ball socket capable of having a gooseneck hitch ball secured thereto.

3. The hitch mounting system of claim 1, wherein the channel member includes at least one leg, wherein the leg is attached to the rail within the mounting aperture and wherein the leg positions the accessory attachment member generally flush with the load bed of the vehicle when the rail is attached to the frame of the vehicle.

4. The hitch mounting system of claim 1, wherein inserting and rotating the accessory attachment member within the channel member selectively attaches the accessory attachment member to the channel member.

5. The hitch mounting system of claim 1, wherein the flange is capable of entering the recess and rotation of the accessory attachment member engages the flange with the channel member and selectively attaches the accessory attachment member to the channel member.

6. The hitch mounting system of claim 5, wherein the accessory attachment member being rotated approximately 90 degrees selectively attaches the accessory attachment member to the channel member.

7. The hitch mounting system of claim 1, wherein the accessory comprises a fifth wheel hitch.

8. A hitch mounting system comprising:
   at least one rail member capable of attaching to a frame of a vehicle generally below a load bed of the vehicle, wherein the at least one rail is a tubular member having a cross-sectional shape defined by an enclosed peripheral wall with a generally hollow section;
   a channel member attached to the rail member;
   an accessory attachment member selectively attached to the channel member, wherein the accessory attachment member is capable of having an accessory mounting member secured thereto, wherein the channel member includes at least one recess and the accessory attachment member includes at least one flange wherein the flange is capable of entering the recess and rotating the accessory attachment member engages the flange with the channel member and selectively attaches the accessory attachment member to the channel member; and
   a locking mechanism generally preventing the accessory attachment member from being removed from the channel member, wherein the locking mechanism further comprises:
   a locking pin;
   a first locking aperture positioned in the accessory attachment member; and
   a second locking aperture positioned in the channel member, wherein the locking pin is capable of being inserted through the locking aperture and engaging the second locking aperture generally preventing the accessory attachment member from being removed from the channel member.

9. The hitch mounting system of claim 8, wherein the channel member comprises a channel.

10. A hitch mounting system comprising:
    at least at least one rail capable of attaching to a frame of a vehicle generally below a load bed of the vehicle, wherein the at least one rail is a tubular member having a cross-sectional shape defined by an enclosed peripheral wall with a generally hollow section; at least one mounting aperture located in the rail; and
    a receiving member positioned in the mounting aperture and attached to the rail, the receiving member comprising:
    a channel member positioned in the mounting aperture and attached to the rail, wherein the channel member has a top surface and includes at least one recess;
    an accessory attachment member attached to the channel member by inserting the accessory attachment member into the channel member and rotating the accessory attachment member, wherein the accessory attachment member is capable of having an accessory mounting member inserted into and secured thereto, and whereby the accessory attachment member includes at least one flange sized to fit within the at least one recess; and
    a locking mechanism generally preventing the accessory attachment member from being removed from the channel member, wherein the locking mechanism further comprises:
    a locking pin;
    a first locking aperture positioned in the accessory attachment member; and
    a second locking aperture positioned in the channel member, wherein the locking pin is capable of being inserted through the locking aperture and engaging the second locking aperture generally preventing the accessory attachment member from being removed from the channel member.

11. The hitch mounting system of claim 10, wherein rotating the accessory attachment member approximately 90 degrees attaches the accessory attachment member to the channel member by engaging the at least one flange with the channel member.

12. A hitch mounting system capable of attaching to a vehicle, the vehicle having a frame and a load bed, the hitch mounting system comprising:
    at least one rail capable of attaching to the frame of the vehicle generally below the load bed of the vehicle, wherein the at least one rail is a tubular member having a cross-sectional shape defined by an enclosed peripheral wall with a generally hollow section;

at least one mounting aperture positioned in a top surface of the rail;

a channel member positioned in the mounting aperture and attached to the rail, wherein the channel member has a top surface positioned generally below the load bed of the vehicle and at least one recess;

an accessory attachment member selectively attached to the channel member, wherein the accessory attachment member is capable of having an accessory secured thereto and wherein the accessory attachment member includes at least one flange insertable into the recess whereby rotation of the accessory attachment member causes the flanges to engage the channel member selectively attaching the accessory attachment member with the channel member; and a locking mechanism generally preventing the accessory attachment member from being removed from the channel member, wherein the locking mechanism further comprises:

a locking pin;

a first locking aperture positioned in the accessory attachment member; and a second locking aperture positioned in the channel member, wherein the locking pin is capable of being inserted through the locking aperture and engaging the second locking aperture generally preventing the accessory attachment member from being removed from the channel member.

13. The hitch mounting system of claim 12, wherein the channel member is positioned entirely below the load bed of the vehicle.

14. A hitch mounting system comprising:

at least one rail configured to fit between a frame and a load bed of a vehicle and configured to attach with the frame, wherein the at least one rail is a tubular member having a cross-sectional shape defined by an enclosed peripheral wall with a generally hollow section;

a mounting aperture located in the rail;

a receiving member positioned over the mounting aperture, wherein the receiving member comprises an attachment portion and a puck portion, wherein the attachment portion comprises at least one flange welded to the rail and the puck portion is configured to accept for engagement an accessory attachment member;

a channel member positioned in the mounting aperture and attached to the rail; and a locking mechanism generally preventing the accessory attachment member from being removed from the channel member, wherein the locking mechanism further comprises:

a locking pin;

a first locking aperture positioned in the accessory attachment member; and a second locking aperture positioned in the channel member, wherein the locking pin is capable of being inserted through the locking aperture and engaging the second locking aperture generally preventing the accessory attachment member from being removed from the channel member.

15. The hitch mounting system of claim 14, wherein the rail comprises a second mounting aperture and a second receiving member, wherein the second receiving member comprises a second attachment portion and a second puck portion, wherein the second attachment portion comprises a second at least one flange welded to the rail and the second puck portion is configured to accept for engagement an accessory attachment member.

16. A hitch mounting system comprising:

at least one rail capable of attaching to a frame of a vehicle generally below a load bed of the vehicle;

at least one mounting aperture located in the rail; and a receiving member positioned in the mounting aperture and attached to the rail, the receiving member comprising:

a channel member positioned in the mounting aperture and attached to the rail, wherein the channel member has a top surface and includes at least one recess;

an accessory attachment member attached to the channel member by inserting the accessory attachment member into the channel member and rotating the accessory attachment member, wherein the accessory attachment member is capable of having an accessory mounting member inserted into and secured thereto, and whereby the accessory attachment member includes at least one flange sized to fit within the at least one recess;

a locking mechanism generally preventing the accessory attachment member from being removed from the channel member, wherein the locking mechanism comprises:

a locking pin;

a first locking aperture positioned in the accessory attachment member; and a second locking aperture positioned in the channel member, wherein the locking pin is capable of being inserted through the locking aperture and engaging the second locking aperture generally preventing the accessory attachment member from being removed from the channel member.

* * * * *